US011401031B2

(12) United States Patent
Ensslin

(10) Patent No.: US 11,401,031 B2
(45) Date of Patent: Aug. 2, 2022

(54) PROPELLER ASSEMBLIES, AIRCRAFT INCLUDING THE SAME, AND ASSOCIATED METHODS

(71) Applicant: Aurora Flight Sciences Corporation, Manassas, VA (US)

(72) Inventor: Oliver Daniel Ensslin, Lucerne (CH)

(73) Assignee: AURORA FLIGHT SCIENCES CORPORATION, Manassas, VA (US)

( * ) Notice: Subject to any disclaimer, the term of this patent is extended or adjusted under 35 U.S.C. 154(b) by 209 days.

(21) Appl. No.: 16/791,311

(22) Filed: Feb. 14, 2020

(65) Prior Publication Data

US 2021/0253231 A1   Aug. 19, 2021

(51) Int. Cl.
*B64C 27/473* (2006.01)
*B64C 27/51* (2006.01)
*B64C 27/37* (2006.01)
*B64C 29/00* (2006.01)

(52) U.S. Cl.
CPC ............ *B64C 27/473* (2013.01); *B64C 27/37* (2013.01); *B64C 27/51* (2013.01); *B64C 29/0025* (2013.01)

(58) Field of Classification Search
CPC ......... B64C 27/30; B64C 27/39; B64C 27/50; B64C 27/022; B64C 29/0025; B64C 11/48; B64C 11/28
See application file for complete search history.

(56) References Cited

U.S. PATENT DOCUMENTS

| | | | | |
|---|---|---|---|---|
| 6,622,962 B1 * | 9/2003 | White | ............... | B64C 27/26 244/12.3 |
| 8,376,264 B1 * | 2/2013 | Hong | ............... | B64C 27/30 244/7 A |
| 10,137,982 B1 * | 11/2018 | Dormiani | ............... | B64C 39/024 |
| 10,392,104 B1 * | 8/2019 | Urban | ............... | B64C 11/28 |
| 2016/0122013 A1 * | 5/2016 | Thompson | ............... | B64C 27/10 416/1 |
| 2016/0347446 A1 * | 12/2016 | Vetter | ............... | B64C 27/26 |
| 2019/0092461 A1 * | 3/2019 | Duffy | ............... | B64C 27/30 |
| 2019/0185143 A1 * | 6/2019 | Zerweckh | ............... | B32B 5/26 |
| 2019/0329877 A1 * | 10/2019 | Benson | ............... | B64C 11/28 |
| 2021/0101677 A1 * | 4/2021 | Thalheimer | ............... | B64C 11/48 |

* cited by examiner

*Primary Examiner* — Joshua J Michener
*Assistant Examiner* — Cindi M Curry
(74) *Attorney, Agent, or Firm* — Dascenzo Gates Intellectual Property Law, P.C.

(57) ABSTRACT

Propeller assemblies, aircraft including the same, and associated methods. A propeller assembly includes a first propeller and a second propeller operatively coupled to a coupling shaft and configured to pivot with respect to one another about a propeller rotation axis. The propeller assembly additionally includes a coupling assembly operatively coupled to the first propeller and the second propeller and configured to transition between a plurality of pivotal configurations defined between and including a stowed configuration and a deployed configuration. The coupling assembly transitions from the stowed configuration toward the deployed configuration when a coupling assembly rotational velocity rises above a threshold stowed rotational velocity. In examples, an aircraft includes one or more propeller assemblies operatively coupled to a fuselage. In some examples, a method of operating a propeller assembly includes automatically transitioning a coupling assembly of the propeller assembly between a stowed configuration and a deployed configuration.

20 Claims, 9 Drawing Sheets

PROPELLER ASSEMBLIES, AIRCRAFT INCLUDING THE SAME, AND ASSOCIATED METHODS

FIELD

The present disclosure relates to propeller assemblies, aircraft including the same, and associated methods.

BACKGROUND

Aircraft such as rotorcraft may utilize propellers to generate a vertical thrust for lifting the aircraft. In some such examples, the propellers are utilized primarily during take-off and landing of the aircraft (and/or for other altitude adjustments), and the aircraft further includes a forward thrust generator for propelling the aircraft forward. In such examples, it is desirable to configure the propellers for maximum vertical thrust production at low rotational velocities, which may be accomplished by increasing the number of propellers and/or the number of propeller blades of each propeller. However, in such examples, it also is desirable to configure the propellers to generate a low drag force when not in use, such as when the aircraft is propelled forward through air.

SUMMARY

Propeller assemblies, aircraft including the same, and associated methods are disclosed herein. A propeller assembly includes a coupling shaft that extends along a propeller rotation axis and a plurality of stacked propellers operatively coupled to the coupling shaft. The plurality of stacked propellers includes at least a first propeller and a second propeller that are configured to pivot with respect to one another about the propeller rotation axis. Each of the first propeller and the second propeller includes a propeller hub and two propeller blades extending radially away from the propeller hub along respective blade longitudinal axes. The propeller assembly additionally includes a coupling assembly operatively coupled to each of the first propeller and the second propeller and configured to rotate about the propeller rotation axis. The coupling assembly is configured to transition between a plurality of pivotal configurations, each of which is characterized by a blade offset angle that is defined between the blade longitudinal axis of a given propeller blade of the first propeller and the blade longitudinal axis of a corresponding propeller blade of the second propeller blade as measured in a plane perpendicular to the propeller rotation axis. The coupling assembly is constrained to assume a configuration among the plurality of pivotal configurations defined between and including a stowed configuration, in which the blade offset angle is a minimum blade offset angle, and a deployed configuration, in which the blade offset angle is a maximum blade offset angle that is greater than the minimum blade offset angle. The coupling assembly is in the deployed configuration when a coupling assembly rotational velocity of the coupling assembly about the propeller rotation axis is at or above a threshold deployed rotational velocity, and the coupling assembly is in the stowed configuration when the coupling assembly rotational velocity is at or below a threshold stowed rotational velocity. The coupling assembly is configured to transition from the stowed configuration toward the deployed configuration when the coupling assembly rotational velocity rises above the threshold stowed rotational velocity.

In some examples, an aircraft includes a fuselage and one or more propeller assemblies operatively coupled to the fuselage. In some examples, a method of operating a propeller assembly includes automatically transitioning a coupling assembly of the propeller assembly between a stowed configuration and a deployed configuration.

DESCRIPTION

Figure 1:
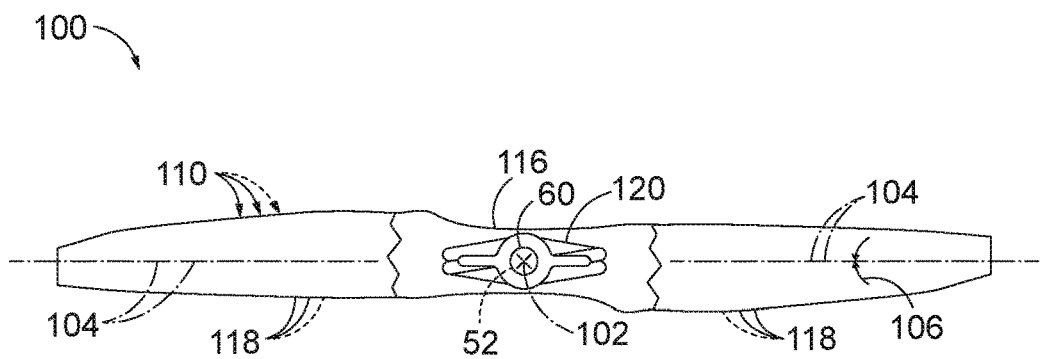
FIG. 1 is a schematic cutaway top plan view illustrating examples of propeller assemblies with a coupling assembly in a stowed configuration according to the present disclosure.

FIGS. 1-11 provide illustrative, non-exclusive examples of propeller assemblies 100, of aircraft 10 incorporating propeller assemblies 100, and/or of methods 200 of operating propeller assemblies 100, according to the present disclosure. Elements that serve a similar, or at least substantially similar, purpose are labeled with like numbers in each of FIGS. 1-11, and these elements may not be discussed in detail herein with reference to each of FIGS. 1-11. Similarly, all elements may not be labeled in each of FIGS. 1-11, but reference numerals associated therewith may be utilized herein for consistency. Elements, components, and/or features that are discussed herein with reference to one or more of FIGS. 1-11 may be included in and/or utilized with any of FIGS. 1-11 without departing from the scope of the present disclosure. Generally, in the Figures, elements that are likely to be included in a given example are illustrated in solid lines, while elements that are optional to a given example are illustrated in dashed lines. However, elements that are illustrated in solid lines are not essential to all examples of the present disclosure, and an element shown in solid lines may be omitted from a particular example without departing from the scope of the present disclosure.

In propeller-driven aircraft (such as rotorcraft), it generally is desirable that each propeller generate a high amount of thrust (e.g., a vertical thrust) at a low rotational velocity, such as to minimize a noise level produced by the propeller. Accordingly, many aircraft utilize propellers that include a plurality of propeller blades that spin at least substantially in unison to generate increased thrust at a given rotational velocity relative to propellers with fewer propeller blades. In some circumstances, however, such multi-bladed propellers may generate an undesirable drag force, such as when the propellers are selectively disabled from producing vertical thrust and the aircraft moves in a forward (e.g., horizontal) direction under the power of a separate thrust source. Accordingly, and as described herein, the present disclosure is directed to propeller assemblies that include a plurality of stacked propellers that are configured to transition between a thrust-generating mode of operation and a low-drag mode of operation.

Figure 2:
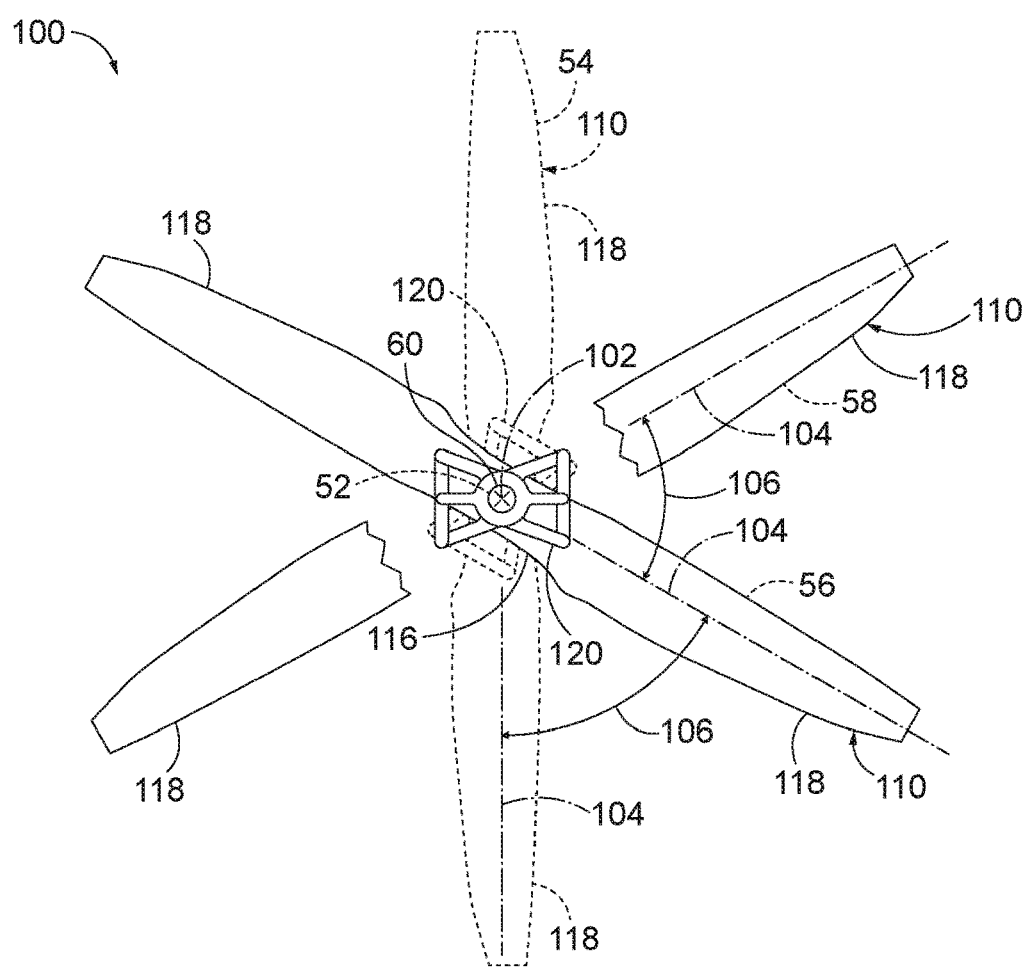
FIG. 2 is a schematic cutaway top plan view illustrating examples of propeller assemblies with a coupling assembly in a deployed configuration according to the present disclosure.
Figure 3:
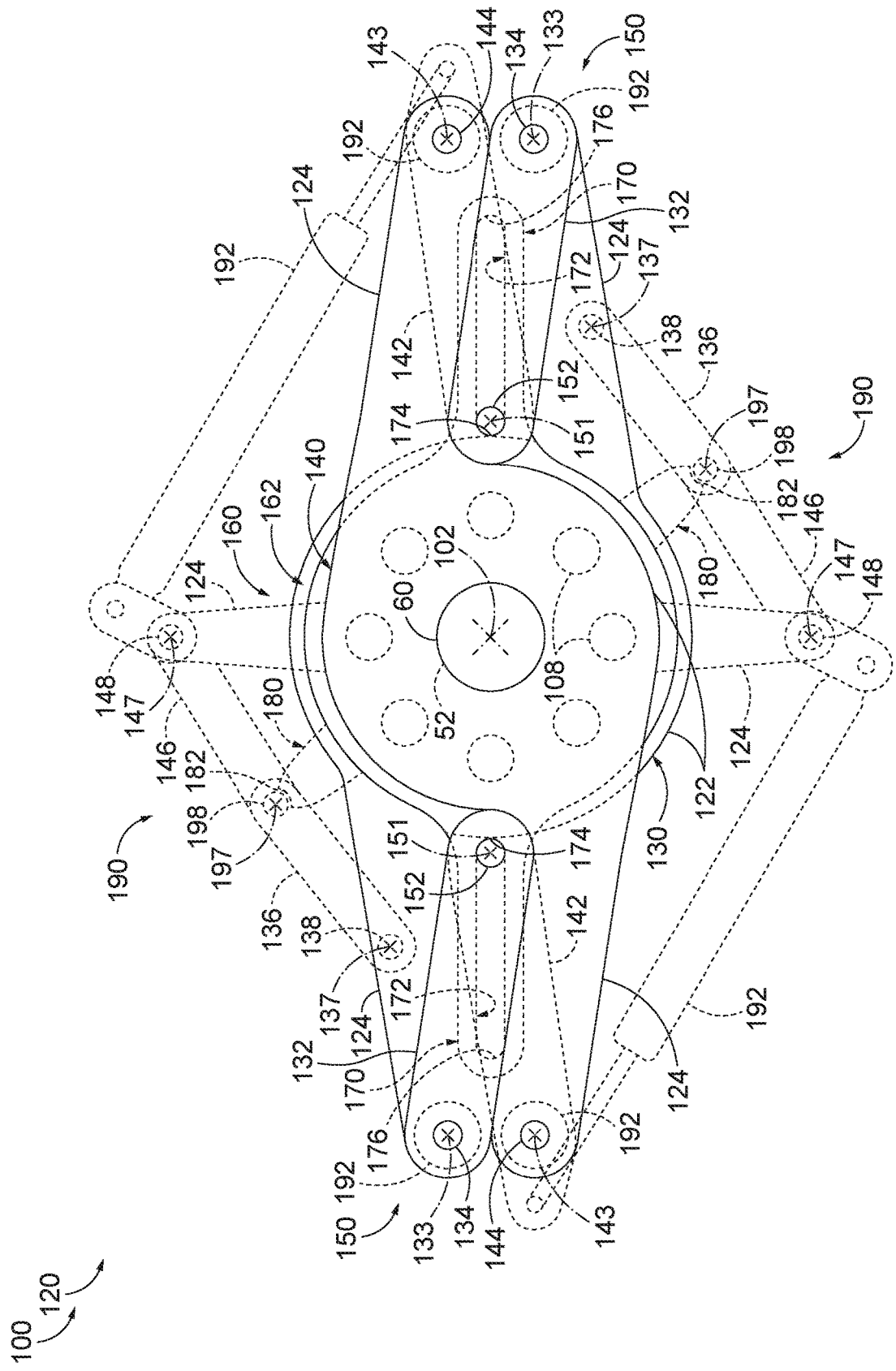
FIG. 3 is a schematic top plan view illustrating examples of coupling assemblies in the stowed configuration according to the present disclosure.
Figure 4:
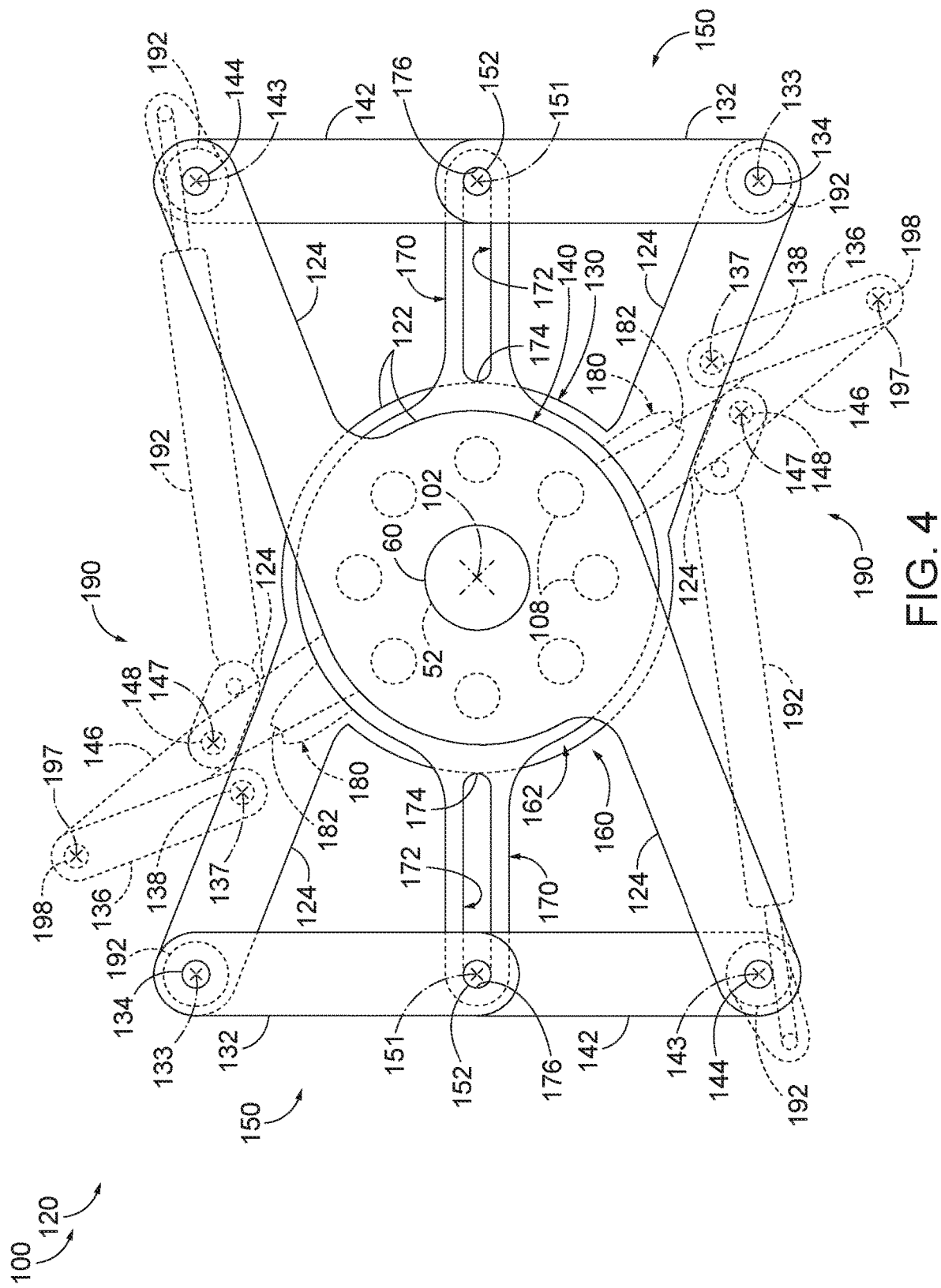
FIG. 4 is a schematic top plan view illustrating examples of coupling assemblies in the deployed configuration according to the present disclosure.
Figure 5:
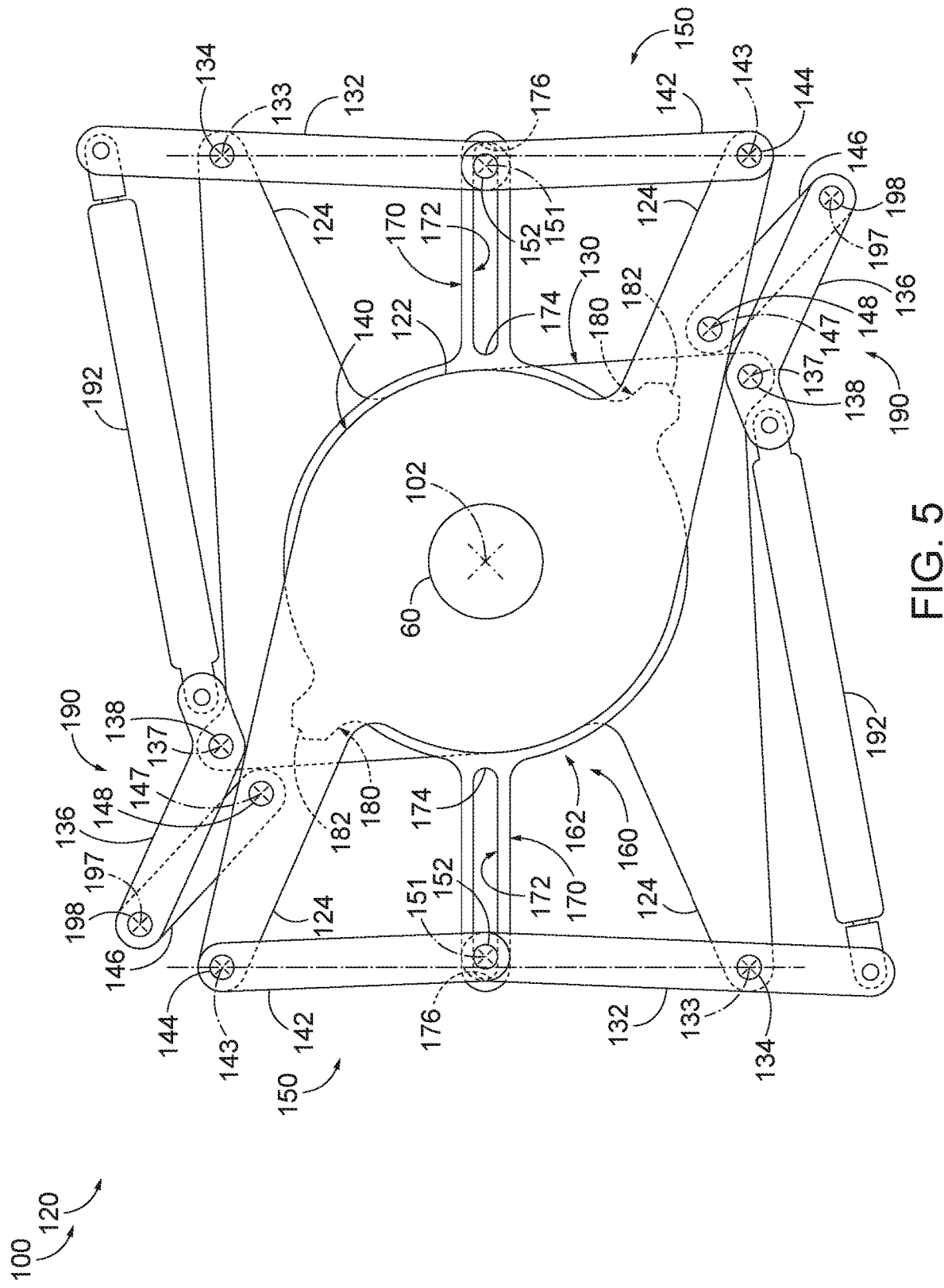
FIG. 5 is a schematic top plan view illustrating an example of a coupling assembly in the deployed configuration according to the present disclosure.

FIGS. 1-2 are schematic illustrations of examples of propeller assemblies 100 that include coupling assemblies 120, while FIGS. 3-4 are schematic illustrations of examples of coupling assemblies 120, and FIG. 5 is a schematic illustration of another example of coupling assembly 120. As schematically illustrated in FIGS. 1-2, a propeller assembly 100 includes a coupling shaft 60 that extends along a propeller rotation axis 102, as well as a plurality of stacked propellers 110 that each are operatively coupled to coupling shaft 60. In some examples, and as additionally schematically illustrated in FIGS. 1-2, propeller assembly 100 includes an input shaft 52 that is configured to convey an input torque to coupling shaft 60 and/or to at least one propeller 110 to rotate the plurality of stacked propellers 110 about propeller rotation axis 102. In some examples, input shaft 52 is operatively coupled to coupling shaft 60. In some such examples, coupling shaft 60 is configured to rotate at least substantially in unison with input shaft 52. In other examples, input shaft 52 includes coupling shaft 60. In some such examples, input shaft 52 and coupling shaft 60 may refer to, include, and/or be the same shaft.

The plurality of stacked propellers 110 includes at least a first propeller 110 and a second propeller 110 that are configured to pivot with respect to one another about propeller rotation axis 102, as described herein. The present disclosure generally is directed to structures and mechanisms for pivotally coupling the first propeller 110 and the second propeller 110 to one another. However, it is to be understood that examples in which the plurality of stacked propellers 110 includes more than two propellers 110 also are within the scope of the present disclosure. For example, FIGS. 1-2 schematically illustrate the first propeller 110 and the second propeller 110 in solid lines and a third propeller 110 in dashed lines. As additional examples, the plurality of stacked propellers 110 may include two propellers 110, three propellers 110, four propellers 110, or more than four propellers 110.

As schematically illustrated in FIGS. 1-2, each propeller 110 includes a propeller hub 116 and two propeller blades 118 extending radially away from propeller hub 116 along a respective blade longitudinal axis 104. In some examples, each propeller blade 118 of propeller 110 is operatively coupled to propeller hub 116 and/or to the other propeller blade 118 of propeller 110. In other examples, propeller hub 116 and each propeller blade 118 of propeller 110 are monolithic, integrally formed, and/or unitary. In such examples, propeller hub 116 and each propeller blade 118 may refer to and/or be respective portions of the respective propeller 110.

As schematically illustrated in FIGS. 1-5, propeller assembly 100 additionally includes a coupling assembly 120 that is operatively coupled to each of the first propeller 110 and the second propeller 110. In some examples, coupling assembly 120 is positioned at least substantially between the first propeller 110 and the second propeller 110. Accordingly, FIGS. 1-2 schematically illustrate the uppermost propeller 110 of the plurality of stacked propellers 110 in a cutaway view such that coupling assembly 120 is visible. Each propeller 110 may be operatively coupled to coupling assembly 120 via any appropriate structure and/or mechanism. For example, and as schematically illustrated in FIGS. 3-4, coupling assembly 120 may include a plurality of mounting fasteners 108 for operatively coupling each propeller 110 to coupling assembly 120, each mounting fastener 108 extending at least substantially parallel to propeller rotation axis 102. In some such examples, each mounting fastener 108 includes and/or is a bolt.

Coupling assembly 120 is configured to rotate about propeller rotation axis 102 at a coupling assembly rotational velocity as the plurality of stacked propellers 110 rotates about propeller rotation axis 102, and coupling assembly 120 is configured to transition between and among a plurality of pivotal configurations at least partially based on the coupling assembly rotational velocity. In this manner, and as described herein, coupling assembly 120 is configured to operatively couple the first propeller 110 and the second propeller 110 to one another with a relative pivotal configuration that is at least partially based on the coupling assembly rotational velocity. More specifically, and as schematically illustrated in FIGS. 1-2, each of the plurality of pivotal configurations of coupling assembly 120 is characterized by a blade offset angle 106 defined between blade longitudinal axis 104 of a given propeller blade 118 of the first propeller 110 and blade longitudinal axis 104 of a corresponding propeller blade 118 of the second propeller 110. Blade offset angle 106 generally is measured in a plane perpendicular to propeller rotation axis 102. Stated differently, blade offset angle 106 generally is measured between respective projections of the corresponding blade longitudinal axes 104 of each propeller blade 118 onto the plane perpendicular to propeller rotation axis 102.

As described herein, coupling assembly 120 is constrained to assume a configuration among the plurality of pivotal configurations defined between and including a stowed configuration (schematically illustrated in FIGS. 1 and 3), in which blade offset angle 106 (labeled in FIG. 1) is equal to a minimum blade offset angle 106, and a deployed configuration (schematically illustrated in FIGS. 2 and 4-5), in which blade offset angle 106 (labeled in FIG. 2) is equal to a maximum blade offset angle 106 that is greater than the minimum blade offset angle 106. That is, blade offset angle 106 is equal to the minimum blade offset angle 106 when coupling assembly 120 is in the stowed configuration, and blade offset angle 106 is equal to the maximum blade offset angle 106 when coupling assembly 120 is in the deployed configuration.

The minimum blade offset angle 106 and the maximum blade offset angle 106 each may have any appropriate value. In some examples, and as schematically illustrated in FIG. 1, the minimum blade offset angle 106 is substantially zero. However, this is not required, and it is additionally within the scope of the present disclosure that the minimum blade offset angle 106 is non-zero. Additionally or alternatively, in some examples, the maximum blade offset angle 106 is at least substantially equal to 180 degrees divided by the number of stacked propellers 110 in the plurality of stacked propellers 110. That is, in some examples, the maximum blade offset angle 106 corresponds to and/or describes a configuration in which the plurality of stacked propellers 110 are at least substantially evenly distributed in the plane perpendicular to propeller rotation axis 102 (e.g., at least substantially evenly spaced apart when viewed along propeller rotation axis 102). As an example, FIG. 2 schematically illustrates an example in which propeller assembly 100 includes three propellers 110 (including propeller 110 illustrated in dashed lines), such that the maximum blade offset angle 106 is substantially equal to 60 degrees. As will be appreciated by a person of ordinary skill in the art, the maximum blade offset angle 106 additionally or alternatively may be based upon any appropriate considerations, such as a configuration of each propeller 110 and/or propeller blade 118, a configuration of a vehicle that utilizes propeller assembly 100, weight considerations, and/or any other appropriate design considerations and/or flight requirements.

The present disclosure generally relates to examples in which the respective blade offset angles 106 (e.g., the respective minimum blade offset angles 106 and/or the respective maximum blade offset angles 106) characterizing each pair of adjacent propellers 110 in the plurality of stacked propellers 110 are at least substantially equal for a given configuration of propeller assembly 100 (e.g., at a given moment). Stated differently, the present disclosure generally relates to examples in which the plurality of stacked propellers 110 may be described as being at least substantially evenly spaced apart, as viewed along propeller rotation axis 102, when each coupling assembly 120 is in the stowed configuration, in the deployed configuration, and/or in an intermediate configuration between the stowed configuration and the deployed configuration. However, this is not required of all examples of propeller assembly 100, and it is additionally within the scope of the present disclosure that the plurality of stacked propellers 110 may be unevenly spaced apart, as viewed along propeller rotation axis 102, when each coupling assembly 120 is in one or more of the stowed configuration, the deployed configuration, and/or an intermediate configuration. Stated differently, it is within the scope of the present disclosure that the respective blade offset angles 106 (e.g., the respective minimum blade offset angles 106 and/or the respective maximum blade offset angles 106) characterizing each pair of adjacent propellers 110 in the plurality of stacked propellers 110 may not all be equal to one another. In some examples, such a configuration may facilitate a reduction in the noise level produced during operative use of propeller assembly 100.

Coupling assembly 120 is configured to transition between the stowed configuration and the deployed configuration at least partially based upon the coupling assembly rotational velocity. Specifically, coupling assembly 120 generally is in the deployed configuration when the coupling assembly rotational velocity is at or above a threshold deployed rotational velocity, and coupling assembly 120 generally is in the stowed configuration when the coupling assembly rotational velocity is at or below a threshold stowed rotational velocity. More specifically, in some examples, coupling assembly 120 is configured to automatically transition from the stowed configuration toward (and/or fully to) the deployed configuration when the coupling assembly rotational velocity rises above the threshold stowed rotational velocity. Similarly, in some examples, coupling assembly 120 is configured to automatically transition from the deployed configuration toward (and/or fully to) the stowed configuration when the coupling assembly rotational velocity falls below the threshold deployed rotational velocity. In this manner, coupling assembly 120 may be configured such that the first propeller 110 and the second propeller 110 are pivotally offset from one another by the maximum blade offset angle 106 when coupling assembly 120, the first propeller 110, and/or the second propeller 110 rotates about propeller rotation axis 102 at or above the threshold deployed rotational velocity, such as while propeller assembly 100 is utilized to produce a vertical thrust. Similarly, coupling assembly 120 may be configured such that the first propeller 110 and the second propeller 110 are at least substantially aligned with one another (e.g., such that blade offset angle 106 is equal to the minimum blade offset angle 106) when coupling assembly 120, the first propeller 110, and/or the second propeller 110 rotates about propeller rotation axis 102 at or below the threshold stowed rotational velocity (and/or when stationary with respect to propeller rotation axis 102), such as to minimize a drag force produced by propeller assembly 100 while traveling forward through air.

FIGS. 3-5 schematically illustrate examples of coupling assembly 120 in more detail. Specifically, FIG. 3 schematically illustrates examples of coupling assembly 120 in the stowed configuration, while FIG. 4 schematically illustrates examples of coupling assembly 120 in the deployed configuration, and FIG. 5 schematically illustrates another example of coupling assembly 120 in the deployed configuration. In some examples, and as schematically illustrated in FIGS. 3-5, coupling assembly 120 includes a first propeller mount 130 that is fixedly coupled to the first propeller 110 (omitted from FIGS. 3-5 for clarity) and a second propeller mount 140 that is fixedly coupled to the second propeller 110 (also omitted from FIGS. 3-5 for clarity). In this manner, first propeller mount 130 generally is configured to rotate about propeller rotation axis 102 at least substantially in unison with the first propeller 110, and second propeller mount 140 generally is configured to rotate about propeller rotation axis 102 at least substantially in unison with the second propeller 110. Accordingly, a pivotal and/or rotational orientation of first propeller mount 130 relative to second propeller mount 140 generally corresponds to and/or defines a pivotal and/or rotational orientation of the first propeller 110 relative to the second propeller 110, and thus further corresponds to and/or defines blade offset angle 106.

As used herein, two or more components may be described as being "fixedly coupled" to one another when the components are operatively coupled and/or connected such that the components move, translate, and/or rotate at least substantially in unison with one another. Accordingly, such components may be described as being "fixedly coupled" to one another even when the components are not static, fixed, and/or restricted from motion relative to a different component. Additionally, such components may be described as being "fixedly coupled" to one another even when the components are not in direct engagement and/or contact with one another.

In some examples, and as schematically illustrated in FIGS. 3-5, coupling assembly 120 additionally includes a plurality of mount coupling mechanisms 150, each of which operatively interconnects first propeller mount 130 and second propeller mount 140, as described herein. In some examples, each of first propeller mount 130 and second propeller mount 140 includes a respective mount hub 122 that is coaxial with propeller rotation axis 102 and a respective plurality of mount arms 124 extending radially away from the respective mount hub 122. In some such examples, and as schematically illustrated in FIGS. 3-5, each mount coupling mechanism 150 includes a first coupling arm 132 that is pivotally coupled to a corresponding mount arm 124 of first propeller mount 130 and a second coupling arm 142 that is pivotally coupled to a corresponding mount arm 124 of second propeller mount 140. More specifically, in such examples, first coupling arm 132 of each mount coupling mechanism 150 is configured to pivot relative to the corresponding mount arm 124 of first propeller mount 130 about a first coupling pivot axis 133. Similarly, in such examples, second coupling arm 142 of each mount coupling mechanism 150 is configured to pivot relative to the corresponding mount arm 124 of second propeller mount 140 about a second coupling pivot axis 143. In such examples, first coupling arm 132 and second coupling arm 142 of each mount coupling mechanism 150 are pivotally interconnected to one another and are configured to pivot relative to one another about a mount pivot axis 151. In this manner, each coupling mechanism 150 may be described as providing a mechanical linkage between first propeller mount 130 and second propeller mount 140. FIGS. 3-5 schematically illustrate examples in which coupling assembly 120 includes two mount coupling mechanisms 150 on opposite sides of propeller rotation axis 102. However, this is not required of all examples of coupling assembly 120, and it is additionally within the scope of the present disclosure that coupling assembly 120 includes more than two mount coupling mechanisms 150.

Each first coupling arm 132 and each second coupling arm 142 may be pivotally connected to the corresponding mount arm 124 and/or to one another via any appropriate pivotal structure. In some examples, and as schematically illustrated in FIGS. 3-5, each mount coupling mechanism 150 includes a first coupling pivotal coupler 134 that pivotally interconnects the respective first coupling arm 132 and the corresponding mount arm 124, a second coupling pivotal coupler 144 that pivotally interconnects the respective second coupling arm 142 and the corresponding mount arm 124, and/or a mount pivotal coupler 152 that pivotally interconnects the respective first coupling arm 132 and the respective second coupling arm 142. In such examples, first coupling pivotal coupler 134, second coupling pivotal coupler 144, and/or mount pivotal coupler 152 may include and/or be any appropriate structure for forming a pivotal connection, examples of which include a pin, a hinge, and/or a joint.

Propeller assembly 100 generally is configured such that one propeller 110 of the plurality of stacked propellers 110 (e.g., the first propeller 110 or the second propeller 110) is a driven propeller 110 that is fixedly coupled to coupling shaft 60 and/or otherwise constrained to rotate about propeller rotation axis 102 in unison with coupling shaft 60. Thus, applying an input torque to coupling shaft 60 operates to rotate the driven propeller 110 about propeller rotation axis 102. In an example in which the driven propeller 110 is the first propeller 110 (or the second propeller 110) that is operatively coupled to the second propeller 110 (or the first propeller 110) via coupling assembly 120, coupling assembly 120 thus operates to transmit the input torque to the second propeller 110 (or the first propeller 110) such that the first propeller 110 and the second propeller 110 rotate about propeller rotation axis 102 at least substantially in unison. More specifically, coupling assembly 120 may transmit the input torque such that the first propeller 110 and the second propeller 110 rotate at least substantially in unison, such as while coupling assembly 120 is not actively transitioning between the plurality of pivotal configurations.

In some examples, coupling assembly 120 is configured to automatically transition from the stowed configuration toward and/or to the deployed configuration responsive to applying the input torque to coupling shaft 60. As an example, in which coupling shaft 60 is fixedly coupled to the first propeller 110 via first propeller mount 130, applying the input torque to coupling shaft 60 generally causes the first propeller 110 to rotate in unison with coupling shaft 60. In an instance in which the rotational velocity of coupling shaft 60 is less than the threshold stowed rotational velocity, coupling assembly 120 and the second propeller 110 also will rotate at least substantially in unison with coupling shaft 60. However, in some examples, when the input torque is increased such that the rotational velocity of coupling shaft 60 rises above the threshold stowed rotational velocity, the inertia of each first coupling arm 132 and each second coupling arm 142 will urge these components away from propeller rotation axis 102, thereby automatically transitioning coupling assembly 120 toward the deployed configuration.

As discussed, coupling assembly 120 generally is configured to restrict and/or limit a range of pivotal motion of first propeller mount 130 relative to second propeller mount 140. In some examples, this is at least partially accomplished via one or more structures that limit a range of motion of each mount coupling mechanism 150 and/or of first coupling arm 132 and/or second coupling arm 142 thereof. More specifically, in some examples, and as schematically illustrated in FIGS. 3-5, coupling assembly 120 includes a coupling assembly stop mechanism 160 that is configured to restrict coupling assembly 120 from assuming a pivotal configuration that is outside the range of pivotal configurations defined between and including the stowed configuration and the deployed configuration. Stated differently, coupling assembly stop mechanism 160 may be described as operating to at least partially define the stowed configuration and/or the deployed configuration.

Coupling assembly stop mechanism 160 may include and/or be any suitable structure for at least partially defining the stowed configuration and/or the deployed configuration. In some examples, and as schematically illustrated in FIGS. 3-5, coupling assembly 120 includes a coupling assembly guide member 162 that is configured to engage a portion of each mount coupling mechanism 150 when coupling assembly 120 is in at least one of the plurality of pivotal configurations. In some such examples, coupling assembly stop mechanism 160 includes coupling assembly guide member 162, as described herein. However, this is not required of all examples of coupling assembly 120, and it is additionally within the scope of the present disclosure that coupling assembly 120 includes coupling assembly guide member 162 that does not operate as, or form a portion of, coupling assembly stop mechanism 160 as described herein.

In some examples, and as schematically illustrated in FIGS. 3-5, coupling assembly guide member 162 includes a plurality of slotted guide arms 170 extending radially away from propeller rotation axis 102. In some such examples, each slotted guide arm 170 defines a slot 172 that terminates at a slot outer stop 176 that is distal propeller rotation axis 102. In some such examples, mount pivotal coupler 152 of each mount coupling mechanism 150 travels within slot 172 of a corresponding slotted guide arm 170 as coupling assembly 120 transitions among the plurality of pivotal configurations. More specifically, in some such examples, and as schematically illustrated in FIG. 4, when coupling assembly 120 is in the deployed configuration, each mount pivotal coupler 152 engages slot outer stop 176 of the corresponding slotted guide arm 170. In this manner, each slotted guide arm 170 may operate to restrict the corresponding mount pivotal coupler 152 from travelling farther away from propeller rotation axis 102 than slot outer stop 176. Accordingly, coupling assembly guide member 162 may be described as at least partially defining the deployed configuration and/or as being configured to at least partially maintain coupling assembly 120 in the deployed configuration.

In some examples, and as schematically illustrated in FIGS. 3-5, slot 172 of each slotted guide arm 170 terminates in a slot inner stop 174 that is proximal propeller rotation axis 102. In some such examples, and as schematically illustrated in FIG. 3, when coupling assembly 120 is in the stowed configuration, mount pivotal coupler 152 of each mount coupling mechanism 150 engages slot inner stop 174 of slot 172 of the corresponding slotted guide arm 170. In this manner, in such examples, coupling assembly guide member 162 and/or slot inner stop 174 may be described as at least partially defining the stowed configuration.

In some examples, and as schematically illustrated in FIG. 4, coupling assembly 120 is configured such that, when coupling assembly 120 is in the deployed configuration, first coupling pivot axis 133, second coupling pivot axis 143, and mount pivot axis 151 of a given mount coupling mechanism 150 are at least substantially coplanar. However, this is not required, and it is additionally within the scope of the present disclosure that mount pivot axis 151 may be proximal propeller rotation axis 102 relative to a plane that includes first coupling pivot axis 133 and second coupling pivot axis 143 when coupling assembly 120 is in the deployed configuration. Such a configuration is schematically illustrated in FIG. 5, which illustrates an example of coupling assembly 120 in the deployed configuration in which mount pivot axis 151 of each mount coupling mechanism 150 is spaced apart from the plane containing the corresponding first coupling pivot axis 133 and the corresponding second coupling pivot axis 143 toward propeller rotation axis 102. In some such examples, and as schematically illustrated in FIG. 5, mount pivotal coupler 152 is spaced apart from slot outer stop 176 when coupling assembly 120 is in the deployed configuration.

As discussed, coupling assembly 120 is configured to transition between the stowed configuration and the deployed configuration based upon the coupling assembly rotational velocity.

Specifically, in some examples, coupling assembly 120 is biased toward the stowed configuration such that coupling assembly 120 transitions from the deployed configuration toward and/or to the stowed configuration when the coupling assembly rotational velocity falls below the threshold deployed rotational velocity. More specifically, in some examples, and as schematically illustrated in FIGS. 3-5, coupling assembly 120 includes one or more return springs 192, each of which is operatively coupled to first propeller mount 130 and/or to second propeller mount 140 to bias coupling assembly 120 toward the stowed configuration.

Each return spring 192 may include and/or be any appropriate structure for urging and/or biasing coupling assembly 120 toward the stowed configuration. As examples, each return spring 192 may include and/or be a linear spring, a gas spring, a rotary spring, a coil spring, and/or a flat coil spring. In some examples, and as schematically illustrated in dashed lines in FIGS. 3-4, coupling assembly 120 includes one or more return springs 192 in the form of flat coil springs that are operatively coupled to first propeller mount 130 or to second propeller mount 140 and to first coupling arm 132 or second coupling arm 142 of mount coupling mechanism 150. In such examples, each flat coil spring thus urges and/or biases the respective first coupling arm 132 (or second coupling arm 142) to pivot about the respective first coupling pivot axis 133 (or second coupling pivot axis 143) to transition coupling assembly 120 toward the stowed configuration.

Additionally or alternatively, in some examples, and as further schematically illustrated in dashed lines in FIGS. 3-4, coupling assembly 120 includes one or more return springs 192 in the form of linear gas springs that are configured to bias coupling assembly 120 toward the stowed configuration. In some such examples, each linear gas spring includes a main cylinder that contains a gas and a plunger that selectively compresses the gas such that driving the plunger into the main cylinder compresses the gas and biases the plunger in a direction out of the main cylinder. Accordingly, in such examples, each linear gas spring is biased toward an extended configuration (schematically illustrated in FIG. 3), such that the linear gas spring is in the extended configuration when coupling assembly 120 is in the stowed configuration and such that the gas is compressed as coupling assembly 120 approaches the deployed configuration. In this manner, utilizing one or more return springs 192 in the form of linear gas springs also may provide a damping functionality, such as to damp a relative pivotal motion of the first propeller 110 and the second propeller 110 as coupling assembly 120 approaches and/or reaches the deployed configuration.

Each return spring 192 may be operatively coupled to one or more other components of coupling assembly 120 in any appropriate manner. In some examples, and as schematically illustrated in FIGS. 3-5, coupling assembly 120 includes at least one return mechanism 190 that biases coupling assembly 120 toward the stowed configuration. In some such examples, each return mechanism 190 includes at least one return spring 192. And as described herein, each return mechanism 190 may be configured to transition coupling assembly 120 toward the stowed configuration when the coupling assembly rotational velocity is less than the threshold deployed rotational velocity. More specifically, in some examples, and as discussed, coupling assembly 120 transitions toward the deployed configuration at least partially responsive to the inertia of first coupling arm 132 and/or second coupling arm 142 urging such components to pivot about first coupling pivot axis 133 and/or second coupling pivot axis 143 radially outward (i.e., away from propeller rotation axis 102) as the coupling assembly rotational velocity increases. Accordingly, in some such examples, return mechanism 190 and/or return spring 192 biases first coupling arm 132 and/or second coupling arm 142 to pivot about first coupling pivot axis 133 and/or second coupling pivot axis 143 in a direction corresponding to first coupling arm 132 and/or second coupling arm 142 moving radially inward (i.e., toward propeller rotation axis 102).

In some examples, and as further schematically illustrated in FIGS. 3-5, each return mechanism 190 additionally includes one or more components that are operatively and/or pivotally coupled to first propeller mount 130 and/or to second propeller mount 140. For example, in some examples, and as schematically illustrated in FIGS. 3-5, each return mechanism 190 includes a first return arm 136 that is pivotally coupled to first propeller mount 130 and a second return arm 146 that is pivotally coupled to second propeller mount 140, with first return arm 136 and second return arm 146 being pivotally interconnected with one another. More specifically, in such examples, and as schematically illustrated in FIGS. 3-5, each first return arm 136 is configured to pivot relative to first propeller mount 130 about a respective first return pivot axis 137, each second return arm 146 is configured to pivot relative to second propeller mount 140 about a respective second return pivot axis 147, and each first return arm 136 is configured to pivot relative to the corresponding second return arm 146 to which it is interconnected about a respective return arm pivot axis 197. In some such examples, each first return arm 136 and each second return arm 146 is pivotally coupled to a corresponding mount arm 124 of first propeller mount 130 or of second propeller mount 140. In some examples, each return mechanism 190 is configured such that return arm pivot axis 197 travels further away from propeller rotation axis 102 as coupling assembly 120 transitions toward the deployed configuration and such that return arm pivot axis 197 travels closer to propeller rotation axis 102 as coupling assembly 120 transitions toward the stowed configuration. FIGS. 3-4 schematically illustrate such an example.

Each first return arm 136 and each second return arm 146 may be pivotally connected to first propeller mount 130 or second propeller mount 140 and/or to one another via any appropriate pivotal structure. In some examples, and as schematically illustrated in FIGS. 3-5, each return mechanism 190 includes a first return pivotal coupler 138 that pivotally interconnects the respective first return arm 136 and first propeller mount 130, a second return pivotal coupler 148 that pivotally interconnects the respective second return arm 146 and second propeller mount 140, and/or a return pivotal coupler 198 that pivotally interconnects the respective first return arm 136 and the respective second return arm 146. In such examples, first return pivotal coupler 138, second return pivotal coupler 148, and/or return pivotal coupler 198 may include and/or be any appropriate structure for forming a pivotal connection, examples of which include a pin, a hinge, and/or a joint.

In some examples, and as schematically illustrated in FIG. 3, when coupling assembly 120 is in the stowed configuration, first return pivot axis 137, second return pivot axis 147, and return arm pivot axis 197 are at least substantially coplanar. However, this is not required, and it is additionally within the scope of the present disclosure that return arm pivot axis 197 is spaced apart from a plane that contains first return pivot axis 137 and second return pivot axis 147 when coupling assembly 120 is in the stowed configuration. For example, in some examples, return arm pivot axis 197 is distal propeller rotation axis 102 relative to the plane that includes each of first return pivot axis 137 and second return pivot axis 147.

In an example in which each return mechanism 190 includes first return arm 136 and second return arm 146, one or more return springs 192 each may be operatively coupled to first return arm 136 and/or to second return arm 146. For example, FIGS. 3-4 depict an example in which two return springs 192 are linear gas springs, each of which is operatively coupled to second return arm 146 of a corresponding return mechanism 190. In general, each return spring 192 may be described as being operatively coupled to and/or as operatively interconnecting two separate components. As more specific examples, each return spring 192 may be operatively coupled to each of two separate components, with each of the separate components being first return arm 136, first coupling arm 132, first propeller mount 130, second return arm 146, second coupling arm 142, or second propeller mount 140.

In some examples, coupling assembly guide member 162 and/or return mechanism 190 includes one or more components that operate to at least partially define the stowed configuration of coupling assembly 120. More specifically, in some examples, and as schematically illustrated in FIGS. 3-5, coupling assembly guide member 162 includes one or more return stop arms 180 terminating at respective return stops 182. In such examples, and as schematically illustrated in FIG. 3, return pivotal coupler 198 of each return mechanism 190 engages return stop 182 of a corresponding return stop arm 180 when coupling assembly 120 is in the stowed configuration. In this manner, in such examples, return stop arm 180 operates to restrict return pivotal coupler 198 from moving nearer to propeller rotation axis 102 than return stop 182, thereby at least partially defining the stowed configuration. In such examples, coupling assembly stop mechanism 160 may be described as including each return stop arm 180.

Figure 6:
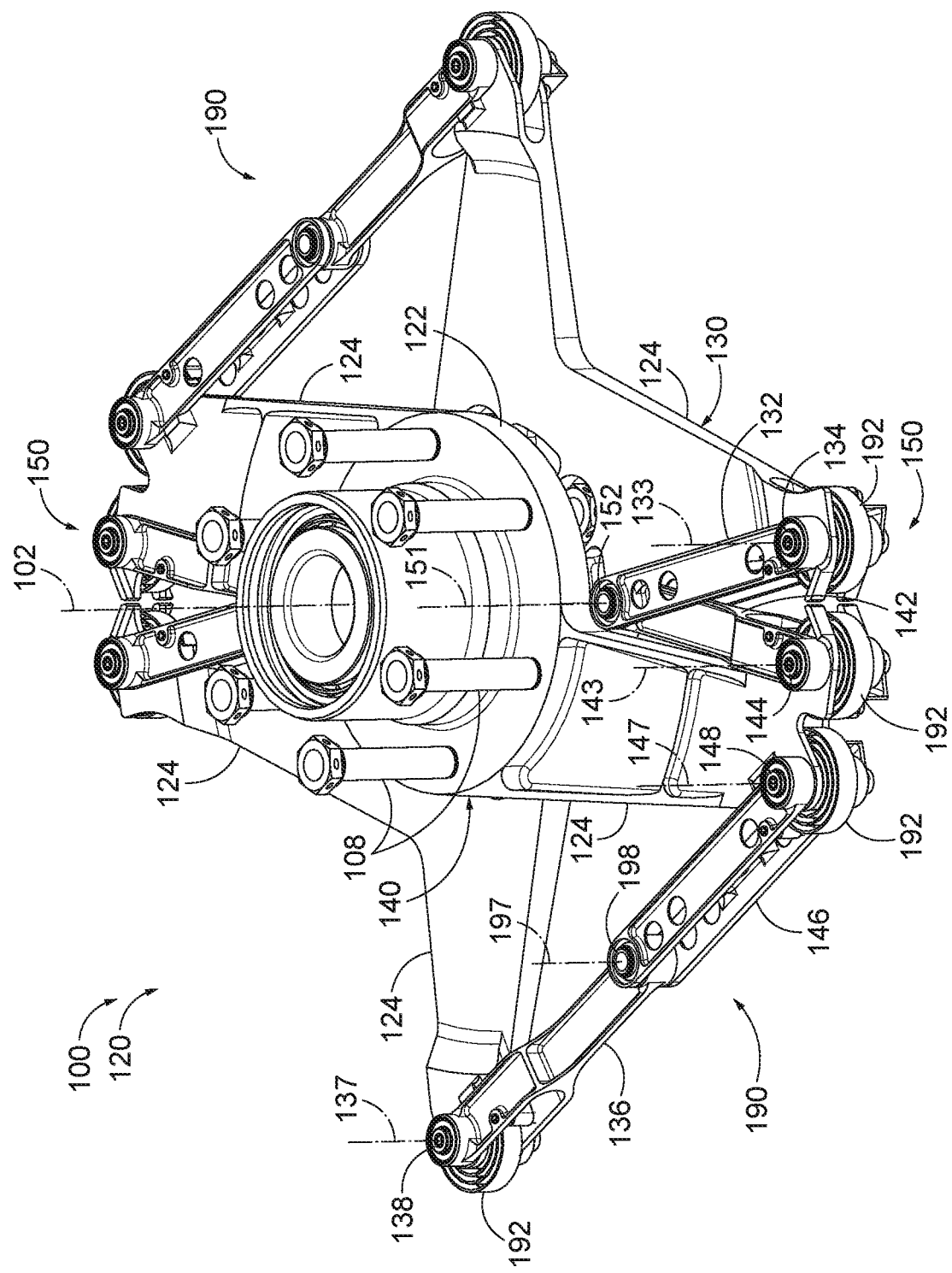
FIG. 6 is a top side isometric view illustrating an example of a coupling assembly in the stowed configuration according to the present disclosure.
Figure 7:
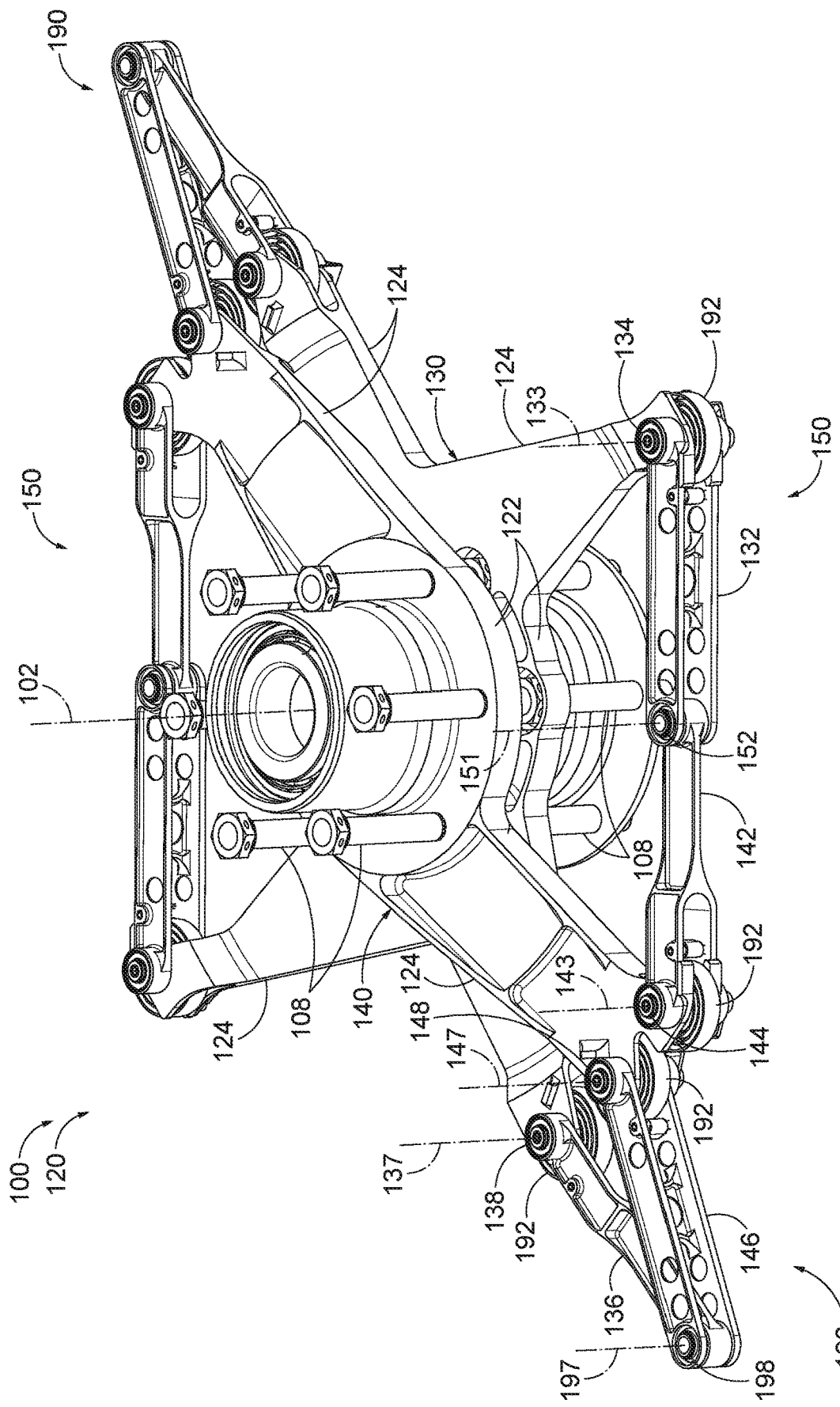
FIG. 7 is a top side isometric view illustrating the coupling assembly of FIG. 6 in the deployed configuration according to the present disclosure.

FIGS. 6-7 are less schematic illustrations of an example of coupling assembly 120. In the example of FIGS. 6-7, coupling assembly 120 includes two mount coupling mechanisms 150, two return mechanisms 190, and a plurality of return springs 192 in the form of flat coil springs. The example coupling assembly 120 of FIGS. 6-7 does not include coupling assembly guide member 162 for defining the stowed configuration and/or the deployed configuration. Instead, in the example of FIGS. 6-7, the stowed configuration and the deployed configuration of coupling assembly 120 each are defined by each mount coupling mechanism 150, each return mechanism 190, and/or two or more mount arms 124. More specifically, and as shown in FIG. 6, the stowed configuration of the example coupling assembly 120 of FIGS. 6-7 is at least partially defined by first return arm 136 and second return arm 146 of each return mechanism 190 being aligned and fully extended. In this manner, first return arm 136 and second return arm 146 of each return mechanism 190 collectively operate to restrict second propeller mount 140 from pivoting relative to first propeller mount 130 in an anticlockwise direction (as viewed from above in the view of FIG. 6). Similarly, and as shown in FIG. 7, the deployed configuration of the example coupling assembly 120 of FIGS. 6-7 is partially defined by first coupling arm 132 and second coupling arm 142 of each mount coupling mechanism 150 being aligned and fully extended. In this manner, first coupling arm 132 and second coupling arm 142 of each mount coupling mechanism 150 collectively operate to restrict second propeller mount 140 from pivoting relative to first propeller mount 130 in a clockwise direction (as viewed from above in the view of FIG. 7). As additionally shown in FIG. 7, the deployed configuration of the example coupling assembly 120 of FIGS. 6-7 also may be described as being partially defined by engagement of respective mount arms 124 of first propeller mount 130 and of second propeller mount 140.

Figure 8:
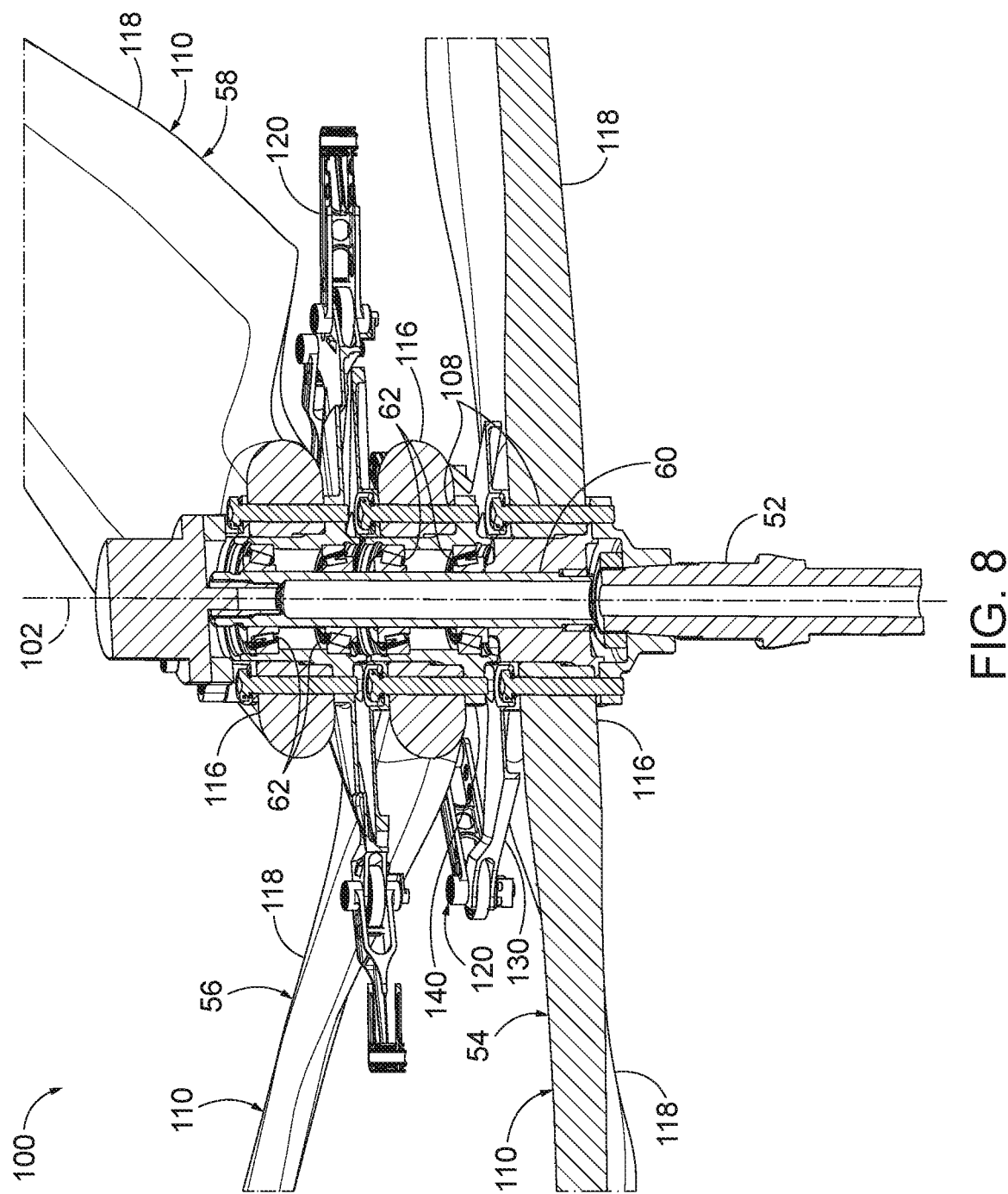
FIG. 8 is a cross-sectional side elevation view illustrating a propeller assembly that includes the coupling assembly of FIGS. 6-7.

FIG. 8 is a cross-sectional view of an example propeller assembly 100 that includes three stacked propellers 110, with each pair of adjacent propellers 110 being operatively coupled to one another by a respective coupling assembly 120. More specifically, each coupling assembly 120 shown in FIG. 8 is the example coupling assembly 120 of FIGS. 6-7. FIG. 8 additionally illustrates an example of propeller assembly 100 in which each propeller 110 is operatively coupled to at least one corresponding coupling assembly 120 via a corresponding plurality of mounting fasteners 108 in the form of bolts extending through the respective propeller hub 116. FIG. 8 further illustrates an example in which propeller assembly 100 includes input shaft 52 that is distinct from coupling shaft 60, with input shaft 52 and coupling shaft 60 being operatively coupled to one another (via a corresponding propeller 110) such that input shaft 52 and coupling shaft 60 rotate at least substantially in unison.

In some examples, and as shown in FIG. 8, the plurality of stacked propellers 110 may be described as including a lower propeller 54 that is positioned below each other stacked propeller 110 and an upper propeller 58 that is positioned above each other stacked propeller 110. In some such examples, and as discussed, one of lower propeller 54 and upper propeller 58 is a driven propeller 110 that is fixedly coupled to input shaft 52 and/or coupling shaft 60, and each other stacked propeller 110 is configured to pivot with respect to input shaft 52 and/or coupling shaft 60. Specifically, in the example of FIG. 8, lower propeller 54 is the driven propeller 110 that is fixedly coupled to each of input shaft 52 and coupling shaft 60, while each propeller 110 above lower propeller 54 is configured to pivot relative to coupling shaft 60. More specifically, in the example of FIG. 8, propeller assembly 100 further includes a plurality of bearings 62 that operatively and rotatably couple each propeller 110 above lower propeller 54 to coupling shaft 60.

As used herein, positional terms such as "vertical," "horizontal," "above," "below," "upward," "downward," and the like may be used to describe spatial orientations of propeller assembly 100 and/or of any components thereof in an illustrative, non-limiting manner, and generally refer to a configuration in which propeller assembly 100 is operative to produce a thrust that is directed vertically upward (e.g., a direction that is opposite a force of gravity). However, such descriptions are not intended as describing or implying that propeller assembly 100 must always be in a given orientation relative to ground and/or relative to the force of gravity.

In some examples, and as further shown in FIG. 8, the plurality of stacked propellers 110 additionally includes one or more intermediate propellers 56 positioned between lower propeller 54 and upper propeller 58. Specifically, FIG. 8 illustrates an example in which propeller assembly 100 includes a single intermediate propeller 56 positioned between lower propeller 54 and upper propeller 58. However, it is additionally within the scope of the present disclosure that propeller assembly 100 may include more than one intermediate propeller 56. In some examples, intermediate propeller 56 (or one of a plurality of intermediate propellers 56) is the driven propeller 110 that is fixedly coupled to input shaft 52 and/or to coupling shaft 60, such that each other stacked propeller 110 of the plurality of stacked propellers is configured to pivot with respect to coupling shaft 60.

Figure 9:
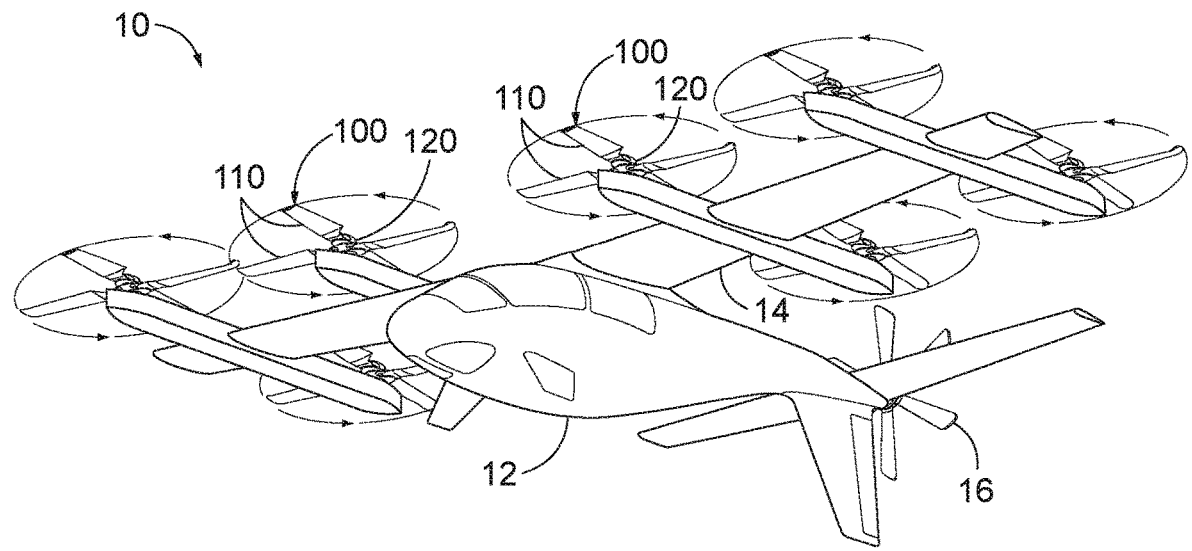
FIG. 9 is a schematic bottom front side isometric view illustrating an example of an aircraft in a vertical lift configuration according to the present disclosure.
Figure 10:
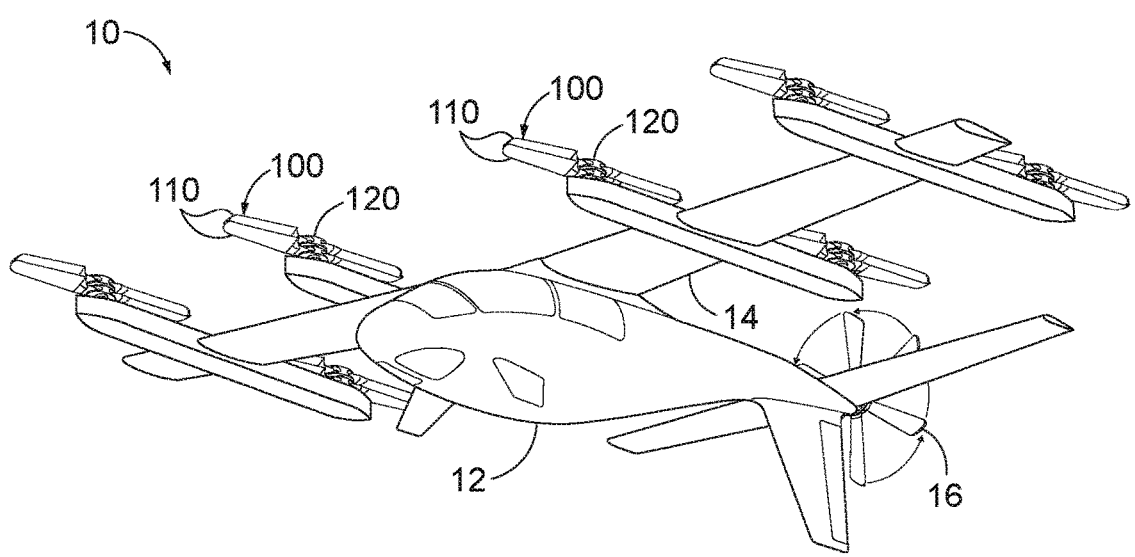
FIG. 10 is a schematic bottom front side isometric view illustrating the aircraft of FIG. 9 in a forward flight configuration according to the present disclosure.

FIGS. 9-10 are schematic illustrations of an aircraft 10 that utilizes propeller assemblies 100. As shown in FIGS. 9-10, aircraft 10 includes a fuselage 12 and one or more propeller assemblies 100 operatively coupled to fuselage 12. In some examples, each propeller assembly 100 is configured to generate a vertical thrust, such as to provide a lift force to aircraft 10. In some examples, and as shown in FIGS. 9-10, aircraft 10 additionally includes one or more wings 14 operatively coupled to fuselage 12 and one or more forward thrust generators 16 configured to generate a forward thrust. That is, in such examples, each forward thrust generator 16 is configured to generate a thrust that is directed at least substantially parallel to a ground surface, and/or at least substantially perpendicular to the vertical thrust produced by each propeller assembly 100, during operative use of aircraft 10.

In this manner, and as described herein, such an aircraft 10 may utilize each propeller assembly 100 to control an altitude of aircraft 10 (such as during takeoff or landing), and may utilize each forward thrust generator 16 to propel aircraft 10 in a forward direction. Accordingly, in some examples, aircraft 10 is configured to be selectively transitioned between a vertical takeoff and landing (VTOL) configuration and a forward flight configuration. FIG. 9 may be described as illustrating aircraft 10 in the VTOL configuration, while FIG. 10 may be described as illustrating aircraft 10 in the forward flight configuration. More specifically, and as shown in FIG. 9, when aircraft 10 is in the VTOL configuration, each coupling assembly 120 of each propeller assembly 100 is in the deployed configuration, and each propeller assembly 100 is operable to generate the vertical thrust. As shown in FIG. 10, when aircraft 10 is in the forward flight configuration, each coupling assembly 120 of each propeller assembly 100 is in the stowed configuration, and each forward thrust generator 16 generates the forward thrust. In some examples, and as shown in FIG. 10, when aircraft 10 is in the forward flight configuration, each propeller assembly 100 is configured such that each corresponding stacked propeller 110 is at least substantially aligned with the forward flight direction. In this manner, when aircraft 10 is in the forward flight configuration, each coupling assembly 120 may automatically transition each propeller 110 to a configuration in which each propeller assembly 100 imparts a reduced and/or minimum drag force on aircraft 10.

Figure 11:
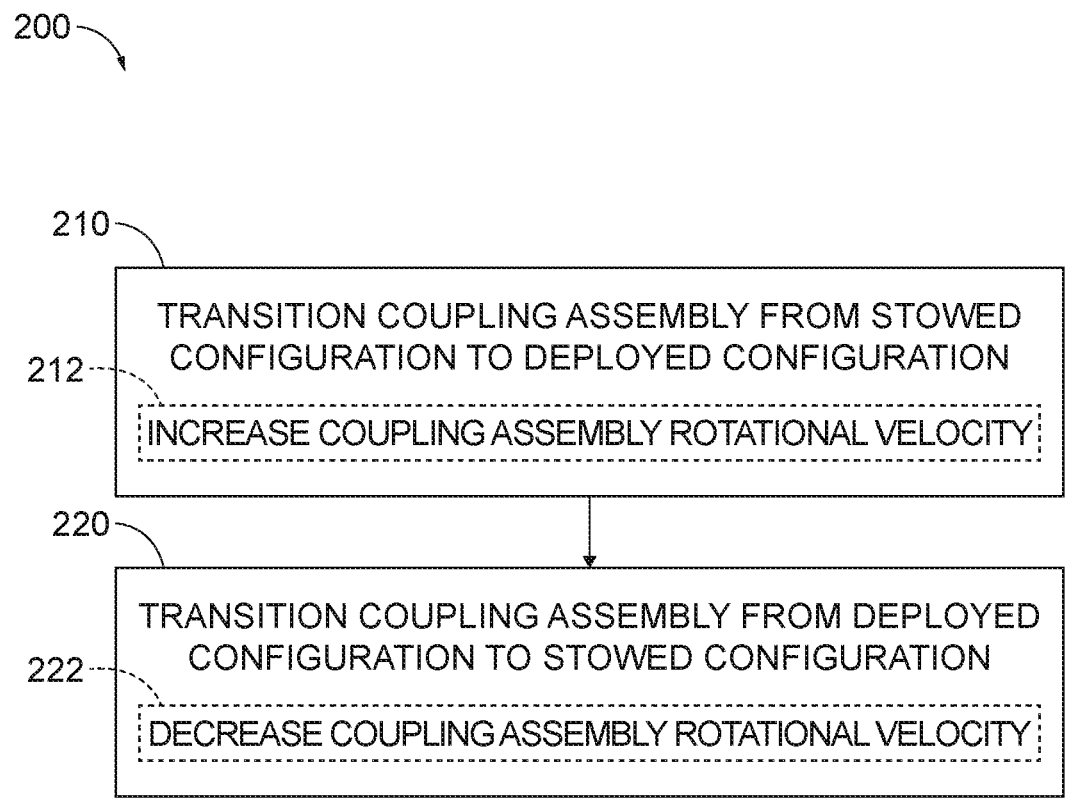
FIG. 11 is a flowchart depicting methods of operating a propeller assembly according to the present disclosure.

FIG. 11 is a flowchart depicting methods 200, according to the present disclosure, of operating a propeller assembly. Specifically, methods 200 pertain to methods of operating a propeller assembly (such as propeller assembly 100) that includes a plurality of stacked propellers (such as propellers 110) including at least a first propeller and a second propeller that are operatively coupled to a coupling shaft (such as coupling shaft 60) such that the first propeller and the second propeller are configured to pivot with respect to one another about a propeller rotation axis (such as propeller rotation axis 102). Methods 200 further pertain to propeller assemblies in which each propeller includes two propeller blades (such as propeller blades 118), each propeller blade extending along a respective blade longitudinal axis (such as blade longitudinal axis 104). Methods 200 further pertain to propeller assemblies that include a coupling assembly (such as coupling assembly 120) that is operatively coupled to each of the first propeller and the second propeller and that is configured to rotate about the propeller rotation axis.

As shown in FIG. 11, method 200 includes transitioning, at 210, the coupling assembly from a stowed configuration to a deployed configuration, and transitioning, at 220, the coupling assembly from the deployed configuration to the stowed configuration. Specifically, when the coupling assembly is in the stowed configuration according to method 200, the blade longitudinal axis of each propeller blade of the first propeller is at least substantially parallel to the blade longitudinal axis of a corresponding propeller blade of the second propeller. When the coupling assembly is in the deployed configuration according to method 200, the blade longitudinal axis of each propeller blade of the first propeller is offset from the blade longitudinal axis of the corresponding propeller blade of the second propeller by a maximum blade offset angle 106, as measured in a plane perpendicular to the propeller rotation axis.

As described herein, the transitioning the coupling assembly from the stowed configuration to the deployed configuration at 210 is performed when a coupling assembly rotational velocity of the coupling assembly about the propeller rotation axis is at or above a threshold deployed rotational velocity. In this manner, the transitioning the coupling assembly from the stowed configuration to the deployed configuration at 210 may be described as being performed automatically. Similarly, and as additionally described herein, the transitioning the coupling assembly from the deployed configuration to the stowed configuration at 220 is performed when the coupling assembly rotational velocity falls below the threshold deployed rotational velocity. In this manner, the transitioning the coupling assembly from the deployed configuration to the stowed configuration at 220 may be described as being performed automatically. Accordingly, the transitioning at 210 and/or the transitioning at 220 may include selectively controlling and/or modulating the coupling assembly rotational velocity. For example, in some examples, and as shown in FIG. 11, the transitioning the coupling assembly from the stowed configuration to the deployed configuration at 210 includes increasing, at 212, the coupling assembly rotational velocity. Similarly, in some examples, and as shown in FIG. 11, the transitioning the coupling assembly from the deployed configuration to the stowed configuration at 220 includes decreasing, at 222, the coupling assembly rotational velocity.

Illustrative, non-exclusive examples of inventive subject matter according to the present disclosure are described in the following enumerated paragraphs:

A1. A propeller assembly (100), comprising:

a coupling shaft (60) that extends along a propeller rotation axis (102);

a plurality of stacked propellers (110) including at least a first propeller (110) and a second propeller (110) that are configured to pivot with respect to one another about the propeller rotation axis (102), each of the first propeller (110) and the second propeller (110) being operatively coupled to the coupling shaft (60) and including a propeller hub (116) and two propeller blades (118) extending radially away from the propeller hub (116), each propeller blade (118) extending along a respective blade longitudinal axis (104); and a coupling assembly (120) operatively coupled to each of the first propeller (110) and the second propeller (110) and configured to rotate about the propeller rotation axis (102);

wherein the coupling assembly (120) is configured to transition between a plurality of pivotal configurations;

wherein each of the plurality of pivotal configurations is characterized by a blade offset angle (106) defined between the blade longitudinal axis (104) of a given propeller blade (118) of the first propeller (110) and the blade longitudinal axis (104) of a corresponding propeller blade (118) of the second propeller (110) and as measured in a plane perpendicular to the propeller rotation axis (102);

wherein the coupling assembly (120) is constrained to assume a configuration among the plurality of pivotal configurations defined between and including a stowed configuration, in which the blade offset angle (106) is a minimum blade offset angle (106), and a deployed configuration, in which the blade offset angle (106) is a maximum blade offset angle (106) that is greater than the minimum blade offset angle (106);

wherein the coupling assembly (120) is in the deployed configuration when a coupling assembly rotational velocity of the coupling assembly (120) about the propeller rotation axis (102) is at or above a threshold deployed rotational velocity; and wherein the coupling assembly (120) is in the stowed configuration when the coupling assembly rotational velocity is at or below a threshold stowed rotational velocity.

A2. The propeller assembly (100) of paragraph A1, wherein the coupling assembly (120) is configured to transition from the stowed configuration toward the deployed configuration when the coupling assembly rotational velocity rises above the threshold stowed rotational velocity.

A3. The propeller assembly (100) of any of paragraphs A1-A2, wherein the coupling assembly (120) is configured to transition from the deployed configuration toward the stowed configuration when the coupling assembly rotational velocity falls below the threshold deployed rotational velocity.

A4. The propeller assembly (100) of any of paragraphs A1-A3, wherein the minimum blade offset angle (106) is substantially zero.

A5. The propeller assembly (100) of any of paragraphs A1-A3, wherein the minimum blade offset angle (106) is nonzero.

A6. The propeller assembly (100) of any of paragraphs A1-A5, wherein the maximum blade offset angle (106) is one or more of at least 10 degrees, at least 30 degrees, least 50 degrees, at least 70 degrees, at most 90 degrees, at most 60 degrees, at most 40 degrees, at most 20 degrees, 90 degrees, 60 degrees, 45 degrees, 36 degrees, and 30 degrees.

A7. The propeller assembly (100) of any of paragraphs A1-A6, wherein the coupling assembly (120) includes:

a first propeller mount (130) that is fixedly coupled to the first propeller (110);

a second propeller mount (140) that is fixedly coupled to the second propeller (110); and a plurality of mount coupling mechanisms (150), each mount coupling mechanism (150) operatively interconnecting the first propeller mount (130) and the second propeller mount (140);

wherein each of the first propeller mount (130) and the second propeller mount (140) includes:

a respective mount hub (122) that is coaxial with the propeller rotation axis (102); and a respective plurality of mount arms (124) extending radially away from the mount hub (122).

A8. The propeller assembly (100) of paragraph A7, wherein each mount coupling mechanism (150) of the plurality of mount coupling mechanisms (150) includes:

a first coupling arm (132) that is pivotally coupled to a corresponding mount arm (124) of the plurality of mount arms (124) of the first propeller mount (130) such that the first coupling arm (132) is configured to pivot relative to the corresponding mount arm (124) about a first coupling pivot axis (133);

a second coupling arm (142) that is pivotally coupled to a corresponding mount arm (124) of the plurality of mount arms (124) of the second propeller mount (140) such that the second coupling arm (142) is configured to pivot relative to the corresponding mount arm (124) about a second coupling pivot axis (143); and wherein the first coupling arm (132) and the second coupling arm (142) of each mount coupling mechanism (150) of the plurality of mount coupling mechanisms (150) are pivotally interconnected and configured to pivot relative to one another about a mount pivot axis (151).

A9. The propeller assembly (100) of paragraph A8, wherein each mount coupling mechanism (150) of the plurality of mount coupling mechanisms (150) further includes one or more of:

(i) a first coupling pivotal coupler (134) that pivotally interconnects the first coupling arm (132) and the corresponding mount arm (124) of the plurality of mount arms (124) of the first propeller mount (130);

(ii) a second coupling pivotal coupler (144) that pivotally interconnects the second coupling arm (142) and the corresponding mount arm (124) of the plurality of mount arms (124) of the second propeller mount (140); and (iii) a mount pivotal coupler (152) that pivotally interconnects the first coupling arm (132) and the second coupling arm (142).

A10. The propeller assembly (100) of paragraph A9, wherein the first coupling pivotal coupler (134) includes one or more of a pin, a hinge, and a joint.

A11. The propeller assembly (100) of any of paragraphs A9-A10, wherein the second coupling pivotal coupler (144) includes one or more of a pin, a hinge, and a joint.

A12. The propeller assembly (100) of any of paragraphs A9-A11, wherein the mount pivotal coupler (152) includes one or more of a pin, a hinge, and a joint.

A13. The propeller assembly (100) of any of paragraphs A1-A12, wherein the coupling assembly (120) further includes a coupling assembly stop mechanism (160) that is configured to restrict the coupling assembly (120) from assuming a pivotal configuration that is outside of a range of pivotal configurations defined between and including the stowed configuration and the deployed configuration.

A14. The propeller assembly (100) of any of paragraphs A1-A13, wherein the coupling assembly (120) includes a coupling assembly guide member (162) that is configured to engage a portion of each mount coupling mechanism (150) of a/the plurality of mount coupling mechanisms (150) when the coupling assembly (120) is in at least one of the plurality of pivotal configurations.

A15. The propeller assembly (100) of paragraph A14, when dependent from paragraph A13, wherein the coupling assembly stop mechanism (160) includes the coupling assembly guide member (162).

A16. The propeller assembly (100) of any of paragraphs A14-A15, wherein the coupling assembly guide member (162) includes a plurality of slotted guide arms (170) extending radially away from the propeller rotation axis (102); and wherein each slotted guide arm (170) of the plurality of slotted guide arms (170) defines a slot (172) that terminates at a slot outer stop (176) that is distal the propeller rotation axis (102).

A17. The propeller assembly (100) of paragraph A16, when dependent from paragraph A9, wherein the mount pivotal coupler (152) of each mount coupling mechanism (150) of the plurality of mount coupling mechanisms (150) travels within the slot (172) of a corresponding slotted guide arm (170) of the plurality of stop arms as the coupling assembly (120) transitions among the plurality of pivotal configurations.

A18. The propeller assembly (100) of paragraph A17, wherein, when the coupling assembly (120) is in the deployed configuration, the mount pivotal coupler (152) of each mount coupling mechanism (150) of the plurality of mount coupling mechanisms (150) engages the slot outer stop (176) of the slot (172) of the corresponding slotted guide arm (170) of the plurality of slotted guide arms (170).

A19. The propeller assembly (100) of any of paragraphs A16-A18, wherein the slot (172) of each slotted guide arm (170) of the plurality of slotted guide arms (170) terminates in a slot inner stop (174) that is proximal the propeller rotation axis (102).

A20. The propeller assembly (100) of paragraph A19, wherein, when the coupling assembly (120) is in the stowed configuration, the mount pivotal coupler (152) of each mount coupling mechanism (150) of the plurality of mount coupling mechanisms (150) engages the slot inner stop (174) of the slot (172) of the corresponding slotted guide arm (170) of the plurality of slotted guide arms (170).

A21. The propeller assembly (100) of any of paragraphs A8-A20, wherein, when the coupling assembly (120) is in the deployed configuration, the first coupling pivot axis (133), the second coupling pivot axis (143), and the mount pivot axis (151) are at least substantially coplanar.

A22. The propeller assembly (100) of any of paragraphs A8-A20, wherein, when the coupling assembly (120) is in the deployed configuration, the mount pivot axis (151) is proximal the propeller rotation axis (102) relative to a plane that includes each of the first coupling pivot axis (133) and the second coupling pivot axis (143).

A23. The propeller assembly (100) of any of paragraphs A7-A22, wherein the coupling assembly (120) includes one or more return springs (192), each return spring (192) of the one or more return springs (192) being operatively coupled to one or both of the first propeller mount (130) and the second propeller mount (140) to bias the coupling assembly (120) toward the stowed configuration.

A24. The propeller assembly (100) of paragraph A23, wherein each return spring (192) of the one or more return springs (192) includes one or more of a linear spring, a gas spring, a rotary spring, a coil spring, and a flat coil spring.

A25. The propeller assembly (100) of any of paragraphs A23-A24, wherein at least one of the one or more return springs (192) is a gas spring that is configured to damp a pivotal motion of the first propeller (110) and the second propeller (110) relative to one another as the coupling assembly (120) approaches the deployed configuration.

A26. The propeller assembly (100) of any of paragraphs A1-A25, wherein the coupling assembly (120) includes at least one return mechanism (190) that biases the coupling assembly (120) toward the stowed configuration.

A27. The propeller assembly (100) of paragraph A26, when dependent from paragraph A23, wherein each return mechanism (190) of the at least one return mechanism (190) includes at least one of the one or more return springs (192).

A28. The propeller assembly (100) of any of paragraphs A26-A27, wherein each return mechanism (190) of the at least one return mechanism (190) is configured to transition the coupling assembly (120) toward the stowed configuration when the coupling assembly rotational velocity is less than the threshold deployed rotational velocity.

A29. The propeller assembly (100) of any of paragraphs A26-A28, wherein each return mechanism (190) of the at least one return mechanism (190) further includes:

a first return arm (136) that is pivotally coupled to a/the first propeller mount (130) such that the first return arm (136) is configured to pivot relative to the first propeller mount (130) about a first return pivot axis (137);

a second return arm (146) that is pivotally coupled to a/the second propeller mount (140) such that the second return arm (146) is configured to pivot relative to the second propeller mount (140) about a second return pivot axis (147); and wherein the first return arm (136) and the second return arm (146) of each return mechanism (190) of the at least one return mechanism (190) are pivotally interconnected and configured to pivot relative to one another about a return arm pivot axis (197).

A30. The propeller assembly (100) of paragraph A29, wherein the first return arm (136) of each return mechanism (190) of the at least one return mechanism (190) is pivotally coupled to a corresponding mount arm (124) of a/the plurality of mount arms (124) of the first propeller mount (130).

A31. The propeller assembly (100) of any of paragraphs A29-A30, wherein the second return arm (146) of each return mechanism (190) of the at least one return mechanism (190) is pivotally coupled to a corresponding mount arm (124) of a/the plurality of mount arms (124) of the second propeller mount (140).

A32. The propeller assembly (100) of any of paragraphs A29-A31, wherein each return mechanism (190) of the at least one return mechanism (190) further includes one or more of:

(i) a first return pivotal coupler (138) that pivotally interconnects the first return arm (136) and the first propeller mount (140);

(ii) a second return pivotal coupler (148) that pivotally interconnects the second return arm (146) and the second propeller mount (140); and (iii) a return pivotal coupler (198) that pivotally interconnects the first return arm (136) and the second return arm (146).

A33. The propeller assembly (100) of paragraph A32, wherein each of the first return pivotal coupler (138) and the second return pivotal coupler (148) includes one or more of a pin, a hinge, and a joint.

A34. The propeller assembly (100) of any of paragraphs A32-A33, wherein the return pivotal coupler (198) includes one or more of a pin, a hinge, and a joint.

A35. The propeller assembly (100) of any of paragraphs A29-A34, wherein, when the coupling assembly (120) is in the stowed configuration, the first return pivot axis (137), the second return pivot axis (147), and the return arm pivot axis (197) are at least substantially coplanar.

A36. The propeller assembly (100) of any of paragraphs A29-A34, wherein, when the coupling assembly (120) is in the stowed configuration, the return arm pivot axis (197) is distal the propeller rotation axis (102) relative to a plane that includes each of the first return pivot axis (137) and the second return pivot axis (147).

A37. The propeller assembly (100) of any of paragraphs A29-A36, wherein the return arm pivot axis (197) travels further away from the propeller rotation axis (102) as the coupling assembly (120) transitions toward the deployed configuration, and wherein the return arm pivot axis (197) travels closer to the propeller rotation axis (102) as the coupling assembly (120) transitions toward the stowed configuration.

A38. The propeller assembly (100) of any of paragraphs A23-A37, wherein each return spring (192) of the one or more return springs (192) is operatively coupled to two components selected from the group consisting of:

(i) a/the first return arm (136) of a corresponding return mechanism (190) of a/the at least one return mechanism (190);

(ii) a/the first coupling arm (132) of a corresponding mount coupling mechanism (150) of a/the plurality of mount coupling mechanisms (150);

(iii) a/the first propeller mount (130);

(iv) a/the second return arm (146) of a corresponding return mechanism (190) of a/the at least one return mechanism (190);

(v) a/the second coupling arm (142) of a corresponding mount coupling mechanism (150) of a/the plurality of mount coupling mechanisms (150); and (vi) a/the second propeller mount (140).

A39. The propeller assembly (100) of any of paragraphs A14-A37, wherein the coupling assembly guide member (162) further includes one or more return stop arms (180), each return stop arm (180) of the one or more return stop arms (180) terminating at a respective return stop (182); and wherein, when the coupling assembly (120) is in the stowed configuration, a/the return pivotal coupler (198) of each return mechanism (190) of the at least one return mechanism (190) engages the return stop (182) of a corresponding return stop arm (180) of the one or more return stop arms (180).

A40. The propeller assembly (100) of any of paragraphs A1-A39, wherein each of the first propeller (110) and the second propeller (110) is operatively coupled to the coupling assembly (120) by a corresponding plurality of mounting fasteners (108) extending at least substantially parallel to the propeller rotation axis (102).

A41. The propeller assembly (100) of paragraph A40, wherein each mounting fastener (108) is a bolt.

A42. The propeller assembly (100) of any of paragraphs A1-A41, wherein the plurality of stacked propellers (110) consists of one of:

(i) two stacked propellers (110);
(ii) three stacked propellers (110);
(iii) four stacked propellers (110); and
(iv) more than four stacked propellers (110).

A43. The propeller assembly (100) of any of paragraphs A1-A42, wherein the maximum blade offset angle (106) is at least substantially equal to 180 degrees divided by the number of stacked propellers (110) in the plurality of stacked propellers (110).

A44. The propeller assembly (100) of any of paragraphs A1-A43, wherein the plurality of stacked propellers (110) includes a lower propeller (54) that is positioned below each other stacked propeller (110) of the plurality of stacked propellers (110) and an upper propeller (58) that is positioned above each other stacked propeller (110) of the plurality of stacked propellers (110).

A45. The propeller assembly (100) of paragraph A44, wherein one of the lower propeller (54) and the upper propeller (58) is fixedly coupled to the coupling shaft (60), and wherein each other stacked propeller (110) of the plurality of stacked propellers (110) is configured to pivot with respect to the coupling shaft (60).

A46. The propeller assembly (100) of any of paragraphs A1-A45, wherein the plurality of stacked propellers (110) includes one or more intermediate propellers (56) positioned between a/the lower propeller (54) and a/the upper propeller (58).

A47. The propeller assembly (100) of paragraph A46, wherein one of the intermediate propellers (56) is fixedly coupled to the coupling shaft (60), and wherein each other stacked propeller (110) of the plurality of stacked propellers (110) is configured to pivot with respect to the coupling shaft (60).

A48. The propeller assembly (100) of any of paragraphs A1-A47, further comprising an input shaft (52) configured to convey an input torque to the coupling shaft (60) to rotate the plurality of stacked propellers (110) about the propeller rotation axis (102).

A49. The propeller assembly (100) of paragraph A48, wherein the input shaft (52) is operatively coupled to the coupling shaft (60).

A50. The propeller assembly (100) of paragraph A48, wherein the input shaft (52) includes the coupling shaft (60).

B1. An aircraft (10), comprising:
a fuselage (12); and
one or more propeller assemblies (100) operatively coupled to the fuselage (12);
wherein each of the one or more propeller assemblies (100) is the propeller assembly (100) of any of paragraphs A1-A50.

B2. The aircraft (10) of paragraph B1, wherein each of the one or more propeller assemblies (100) is configured to generate a vertical thrust.

B3. The aircraft (10) of any of paragraphs B1-B2, further comprising:

one or more wings (14) operatively coupled to the fuselage (12); and one or more forward thrust generators (16) configured to generate a forward thrust that is directed at least substantially parallel to a ground surface during operative use of the aircraft (10).

B4. The aircraft (10) of paragraph B3, wherein the aircraft (10) is configured to be selectively transitioned between a vertical takeoff and landing (VTOL) configuration, in which each coupling assembly (120) of each of the one or more propeller assemblies (100) is in the deployed configuration and in which each of the one or more propeller assemblies (100) is operable to generate a/the vertical thrust, and a forward flight configuration, in which each coupling assembly (120) of each of the one or more propeller assemblies (100) is in the stowed configuration and in which the one or more forward thrust generators (16) generate the forward thrust.

C1. A method (200) of operating a propeller assembly (100) that includes a plurality of stacked propellers (110) including at least a first propeller (110) and a second propeller (110) that are operatively coupled to a coupling shaft (60) and that are configured to pivot with respect to one another about a propeller rotation axis (102), each of the first propeller (110) and the second propeller (110) including two propeller blades (118), each propeller blade (118) extending along a respective blade longitudinal axis (104), the propeller assembly (100) further including a coupling assembly (120) operatively coupled to each of the first propeller (110) and the second propeller (110) and configured to rotate about the propeller rotation axis (102), the method comprising:

transitioning (210) the coupling assembly (120) from a stowed configuration, in which the blade longitudinal axis (104) of each propeller blade (118) of the first propeller (110) is at least substantially parallel to the blade longitudinal axis (104) of a corresponding propeller blade (118) of the second propeller (110), to a deployed configuration, in which the blade longitudinal axis (104) of each propeller blade (118) of the first propeller (110) is offset from the blade longitudinal axis (104) of the corresponding propeller blade (118) of the second propeller (110) by a maximum blade offset angle (106), as measured in a plane perpendicular to the propeller rotation axis (102); and transitioning (220) the coupling assembly (120) from the deployed configuration to the stowed configuration;

wherein the transitioning (210) the coupling assembly (120) from the stowed configuration to the deployed configuration is performed automatically when a coupling assembly rotational velocity of the coupling assembly (120) about the propeller rotation axis (102) is at or above a threshold deployed rotational velocity; and wherein the transitioning (220) the coupling assembly (120) from the deployed configuration to the stowed configuration is performed automatically when the coupling assembly rotational velocity falls below the threshold deployed rotational velocity.

C2. The method (200) of paragraph C1, wherein the transitioning (210) the coupling assembly (120) from the stowed configuration to the deployed configuration includes increasing (212) the coupling assembly rotational velocity, and wherein the transitioning (220) the coupling assembly (120) from the deployed configuration to the stowed configuration includes decreasing (222) the coupling assembly rotational velocity.

C3. The method (200) of any of paragraphs C1-C2, wherein the propeller assembly (100) is the propeller assembly (100) of any of paragraphs A1-A50.

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction.

As used herein, the terms "selective" and "selectively," when modifying an action, movement, configuration, or other activity of one or more components or characteristics of an apparatus, mean that the specific action, movement, configuration, or other activity is a direct or indirect result of one or more dynamic processes, as described herein. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order, concurrently, and/or repeatedly. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

The various disclosed elements of apparatuses and systems and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein and such inventive subject matter may find utility in apparatuses, systems, and/or methods that are not expressly disclosed herein.

The invention claimed is:

1. A propeller assembly, comprising:
a coupling shaft that extends along a propeller rotation axis;
a plurality of stacked propellers including at least a first propeller and a second propeller that are configured to pivot with respect to one another about the propeller rotation axis, each of the first propeller and the second propeller being operatively coupled to the coupling shaft and including a propeller hub and two propeller blades extending radially away from the propeller hub, each propeller blade extending along a respective blade longitudinal axis; and
a coupling assembly operatively coupled to each of the first propeller and the second propeller and configured to rotate about the propeller rotation axis;
wherein the coupling assembly is configured to transition between a plurality of pivotal configurations;
wherein each of the plurality of pivotal configurations is characterized by a blade offset angle defined between the blade longitudinal axis of a given propeller blade of the first propeller and the blade longitudinal axis of a corresponding propeller blade of the second propeller and as measured in a plane perpendicular to the propeller rotation axis;
wherein the coupling assembly is constrained to assume a configuration among the plurality of pivotal configurations defined between and including a stowed configuration, in which the blade offset angle is a minimum blade offset angle, and a deployed configuration, in which the blade offset angle is a maximum blade offset angle that is greater than the minimum blade offset angle, wherein the maximum blade offset angle is at least 30 degrees and at most 90 degrees;
wherein the coupling assembly is in the deployed configuration when a coupling assembly rotational velocity of the coupling assembly about the propeller rotation axis is at or above a threshold deployed rotational velocity;
wherein the coupling assembly is in the stowed configuration when the coupling assembly rotational velocity is at or below a threshold stowed rotational velocity; and
wherein the coupling assembly is configured to transition from the stowed configuration toward the deployed configuration when the coupling assembly rotational velocity rises above the threshold stowed rotational velocity.

2. The propeller assembly of claim 1, wherein the coupling assembly is configured to transition from the deployed configuration toward the stowed configuration when the coupling assembly rotational velocity falls below the threshold deployed rotational velocity.

3. The propeller assembly of claim 1, wherein the coupling assembly includes:

a first propeller mount that is fixedly coupled to the first propeller;

a second propeller mount that is fixedly coupled to the second propeller; and a plurality of mount coupling mechanisms, each mount coupling mechanism operatively interconnecting the first propeller mount and the second propeller mount;

wherein each of the first propeller mount and the second propeller mount includes:

a respective mount hub that is coaxial with the propeller rotation axis; and a respective plurality of mount arms extending radially away from the mount hub.

4. The propeller assembly of claim 3, wherein each mount coupling mechanism of the plurality of mount coupling mechanisms includes:

a first coupling arm that is pivotally coupled to a corresponding mount arm of the plurality of mount arms of the first propeller mount such that the first coupling arm is configured to pivot relative to the corresponding mount arm about a first coupling pivot axis;

a second coupling arm that is pivotally coupled to a corresponding mount arm of the plurality of mount arms of the second propeller mount such that the second coupling arm is configured to pivot relative to the corresponding mount arm about a second coupling pivot axis; and a mount pivotal coupler that pivotally interconnects the first coupling arm and the second coupling arm such that the first coupling arm and the second coupling arm are configured to pivot relative to one another about a mount pivot axis.

5. The propeller assembly of claim 4, wherein the coupling assembly further includes a coupling assembly stop mechanism that is configured to restrict the coupling assembly from assuming a pivotal configuration that is outside of a range of pivotal configurations defined between and including the stowed configuration and the deployed configuration; wherein the coupling assembly stop mechanism includes a coupling assembly guide member that is configured to engage a portion of each mount coupling mechanism of the plurality of mount coupling mechanisms when the coupling assembly is in at least one of the plurality of pivotal configurations; wherein the coupling assembly guide member includes a plurality of slotted guide arms extending radially away from the propeller rotation axis; and wherein each slotted guide arm of the plurality of slotted guide arms defines a slot that terminates at a slot outer stop that is distal the propeller rotation axis.

6. The propeller assembly of claim 5, wherein the mount pivotal coupler of each mount coupling mechanism of the plurality of mount coupling mechanisms travels within the slot of a corresponding slotted guide arm of the plurality of slotted guide arms as the coupling assembly transitions among the plurality of pivotal configurations; and wherein, when the coupling assembly is in the deployed configuration, the mount pivotal coupler of each mount coupling mechanism of the plurality of mount coupling mechanisms engages the slot outer stop of the slot of the corresponding slotted guide arm of the plurality of slotted guide arms.

7. The propeller assembly of claim 5, wherein, when the coupling assembly is in the deployed configuration, the first coupling pivot axis, the second coupling pivot axis, and the mount pivot axis are at least substantially coplanar.

8. The propeller assembly of claim 5, wherein the coupling assembly includes one or more return springs, each return spring of the one or more return springs being operatively coupled to one or both of the first propeller mount and the second propeller mount to bias the coupling assembly toward the stowed configuration; wherein the coupling assembly includes at least one return mechanism that biases the coupling assembly toward the stowed configuration; and wherein each return mechanism of the at least one return mechanism includes at least one of the one or more return springs.

9. The propeller assembly of claim 8, wherein each return mechanism of the at least one return mechanism further includes:

a first return arm that is pivotally coupled to the first propeller mount such that the first return arm is configured to pivot relative to the first propeller mount about a first return pivot axis;

a second return arm that is pivotally coupled to the second propeller mount such that the second return arm is configured to pivot relative to the second propeller mount about a second return pivot axis; and a return pivotal coupler that pivotally interconnects the first return arm and the second return arm such that the first return arm and the second return arm are configured to pivot relative to one another about a return arm pivotal axis; and wherein each return spring of the one or more return springs is operatively coupled to two components selected from the group consisting of:

(i) the first return arm of a corresponding return mechanism of the at least one return mechanism;

(ii) the first coupling arm of a corresponding mount coupling mechanism of the plurality of mount coupling mechanisms;

(iii) the first propeller mount;

(iv) the second return arm of a corresponding return mechanism of the at least one return mechanism;

(v) the second coupling arm of a corresponding mount coupling mechanism of the plurality of mount coupling mechanisms; and (vi) the second propeller mount.

10. The propeller assembly of claim 9, wherein the coupling assembly guide member further includes a one or more return stop arms, each return stop arm of the one or more return stop arms terminating at a respective return stop; and wherein, when the coupling assembly is in the stowed configuration, the return pivotal coupler of each return mechanism of the at least one return mechanism engages the return stop of a corresponding return stop arm of the one or more return stop arms.

11. The propeller assembly of claim 8, wherein at least one of the one or more return springs is a gas spring that is configured to damp a pivotal motion of the first propeller and the second propeller relative to one another as the coupling assembly approaches the deployed configuration.

12. The propeller assembly of claim 1, wherein the plurality of stacked propellers further includes a third propeller; wherein the coupling assembly is a first coupling assembly; and wherein the propeller assembly further includes a second coupling assembly operatively coupled to each of the second propeller and the third propeller.

13. The propeller assembly of claim 1, wherein the plurality of stacked propellers includes a lower propeller that is positioned below each other stacked propeller of the plurality of stacked propellers and an upper propeller that is positioned above each other stacked propeller of the plurality of stacked propellers; wherein one of the lower propeller and the upper propeller is fixedly coupled to the coupling shaft; and wherein each other stacked propeller of the plurality of stacked propellers is configured to pivot with respect to the coupling shaft.

14. The propeller assembly of claim 1, wherein the plurality of stacked propellers includes a lower propeller that is positioned below each other stacked propeller of the plurality of stacked propellers, an upper propeller that is positioned above each other stacked propeller of the plurality of stacked propellers, and one or more intermediate propellers positioned between the lower propeller and the upper propeller; wherein one of the intermediate propellers is fixedly coupled to the coupling shaft; and wherein each other stacked propeller of the plurality of stacked propellers is configured to pivot with respect to the coupling shaft.

15. An aircraft, comprising:
a fuselage; and
one or more propeller assemblies operatively coupled to the fuselage;
wherein each of the one or more propeller assemblies includes:
a coupling shaft that extends along a propeller rotation axis;
a plurality of stacked propellers including at least a first propeller and a second propeller that are configured to pivot with respect to one another about the propeller rotation axis, each of the first propeller and the second propeller being operatively coupled to the coupling shaft and including a propeller hub and two propeller blades extending radially away from the propeller hub, each propeller blade extending along a respective blade longitudinal axis; and
a coupling assembly operatively coupled to each of the first propeller and the second propeller and configured to rotate about the propeller rotation axis;
wherein the coupling assembly is configured to transition between a plurality of pivotal configurations;
wherein each of the plurality of pivotal configurations is characterized by a blade offset angle defined between the blade longitudinal axis of a given propeller blade of the first propeller and the blade longitudinal axis of a corresponding propeller blade of the second propeller and as measured in a plane perpendicular to the propeller rotation axis;
wherein the coupling assembly is constrained to assume a configuration among the plurality of pivotal configurations defined between and including a stowed configuration, in which the blade offset angle is a minimum blade offset angle, and a deployed configuration, in which the blade offset angle is a maximum blade offset angle that is greater than the minimum blade offset angle, wherein the maximum blade offset angle is at least 30 degrees and at most 90 degrees;
wherein the coupling assembly is in the deployed configuration when a coupling assembly rotational velocity of the coupling assembly about the propeller rotation axis is at or above a threshold deployed rotational velocity;
wherein the coupling assembly is in the stowed configuration when the coupling assembly rotational velocity is at or below a threshold stowed rotational velocity;
wherein the coupling assembly is configured to transition from the stowed configuration toward the deployed configuration when the coupling assembly rotational velocity rises above the threshold stowed rotational velocity.

16. The aircraft of claim 15, further comprising:
one or more wings operatively coupled to the fuselage; and
one or more forward thrust generators configured to generate a forward thrust that is directed at least substantially parallel to a ground surface during operative use of the aircraft.

17. The aircraft of claim 16, wherein the aircraft is configured to be selectively transitioned between a vertical takeoff and landing (VTOL) configuration, in which each coupling assembly of each of the one or more propeller assemblies is in the deployed configuration and in which each of the one or more propeller assemblies is operable to generate a vertical thrust, and a forward flight configuration, in which each coupling assembly of each of the one or more propeller assemblies is in the stowed configuration and in which the one or more forward thrust generators generate the forward thrust.

18. A method of operating a propeller assembly that includes a plurality of stacked propellers including at least a first propeller and a second propeller that are operatively coupled to a coupling shaft and that are configured to pivot with respect to one another about a propeller rotation axis, each of the first propeller and the second propeller including two propeller blades, each propeller blade extending along a respective blade longitudinal axis, the propeller assembly further including a coupling assembly operatively coupled to each of the first propeller and the second propeller and configured to rotate about the propeller rotation axis, the method comprising:
transitioning the coupling assembly from a stowed configuration, in which the blade longitudinal axis of each propeller blade of the first propeller is at least substantially parallel to the blade longitudinal axis of a corresponding propeller blade of the second propeller, to a deployed configuration, in which the blade longitudinal axis of each propeller blade of the first propeller is offset from the blade longitudinal axis of the corresponding propeller blade of the second propeller by a maximum blade offset angle, as measured in a plane perpendicular to the propeller rotation axis; and
transitioning the coupling assembly from the deployed configuration to the stowed configuration;
wherein the transitioning the coupling assembly from the stowed configuration to the deployed configuration is performed automatically when a coupling assembly rotational velocity of the coupling assembly about the propeller rotation axis is at or above a threshold deployed rotational velocity; and
wherein the transitioning the coupling assembly from the deployed configuration to the stowed configuration is performed automatically when the coupling assembly rotational velocity falls below the threshold deployed rotational velocity.

19. The method of claim 18, wherein the transitioning the coupling assembly from the stowed configuration to the deployed configuration includes increasing the coupling assembly rotational velocity, and wherein the transitioning the coupling assembly from the deployed configuration to the stowed configuration includes decreasing the coupling assembly rotational velocity.

20. The propeller assembly of claim 1, wherein the coupling assembly further comprises at least one return mechanism that biases the coupling assembly toward the stowed configuration.

* * * * *

UNITED STATES PATENT AND TRADEMARK OFFICE
CERTIFICATE OF CORRECTION

| | |
|---|---|
| PATENT NO. | : 11,401,031 B2 |
| APPLICATION NO. | : 16/791311 |
| DATED | : August 2, 2022 |
| INVENTOR(S) | : Oliver Daniel Ensslin |

It is certified that error appears in the above-identified patent and that said Letters Patent is hereby corrected as shown below:

On the Title Page

At "(71) Applicant," the text should be changed to --AURORA FLIGHT SCIENCES CORPORATION, a subsidiary of THE BOEING COMPANY, Manassas, VA (US)--; and At "(73) Assignee," the text should be changed to --AURORA FLIGHT SCIENCES CORPORATION, a subsidiary of THE BOEING COMPANY, Manassas, VA (US)--.

Signed and Sealed this
Fifteenth Day of November, 2022

Katherine Kelly Vidal
*Director of the United States Patent and Trademark Office*